US010002478B2

(12) United States Patent
Van Dyken et al.

(10) Patent No.: US 10,002,478 B2
(45) Date of Patent: Jun. 19, 2018

(54) IDENTIFICATION AND AUTHENTICATION IN A SHARED ACOUSTIC SPACE

(71) Applicant: QUALCOMM Incorporated, San Diego, CA (US)

(72) Inventors: Shaun William Van Dyken, San Diego, CA (US); Erik Visser, San Diego, CA (US); Asif Iqbal Mohammad, San Diego, CA (US); Samir Kumar Gupta, San Diego, CA (US); Lae-Hoon Kim, San Diego, CA (US); Sreekanth Narayanaswamy, San Diego, CA (US); Phuong Ton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 14/966,815

(22) Filed: Dec. 11, 2015

(65) Prior Publication Data

US 2016/0171806 A1    Jun. 16, 2016

Related U.S. Application Data

(60) Provisional application No. 62/091,386, filed on Dec. 12, 2014.

(51) Int. Cl.
*G07C 9/00* (2006.01)
*G06F 21/32* (2013.01)
*G06K 9/00* (2006.01)
*H04R 3/00* (2006.01)

(52) U.S. Cl.
CPC ......... *G07C 9/00158* (2013.01); *G06F 21/32* (2013.01); *G06K 9/00288* (2013.01); *G06K 9/00335* (2013.01); *H04R 3/005* (2013.01)

(58) Field of Classification Search
CPC .................................................. G07C 9/00158
USPC ........................................................ 367/199
See application file for complete search history.

(56) References Cited

U.S. PATENT DOCUMENTS

| | | | |
|---|---|---|---|
| 6,593,956 | B1 | 7/2003 | Potts et al. |
| 7,602,947 | B1 | 10/2009 | Lemelson et al. |
| 7,898,385 | B2 | 3/2011 | Kocher |
| 2007/0124599 | A1 | 5/2007 | Morita et al. |
| 2009/0055180 | A1 | 2/2009 | Coon et al. |
| 2010/0148923 | A1 | 6/2010 | Takizawa |

(Continued)

OTHER PUBLICATIONS

International Search Report and Written Opinion for International Application No. PCT/US2015/065411, ISA/EPO, dated Mar. 3, 2016, 14 pages.

*Primary Examiner* — Allen T Cao
(74) *Attorney, Agent, or Firm* — Toler Law Group, P.C.

(57) ABSTRACT

A system includes a memory configured to store data associated with a service that is available. The system also includes a microphone associated with an acoustic space and configured to receive an audio input produced by a person. The system further includes a sensor located within the acoustic space and configured to detect vibrations produced by the person. The system includes a processor coupled to the memory, to the microphone, and to the sensor. The processor is configured to conditionally authorize execution of the service requested by the person, the service conditionally authorized based on the audio input and the vibrations.

30 Claims, 7 Drawing Sheets

(56) References Cited

U.S. PATENT DOCUMENTS

| | | |
|---|---|---|
| 2013/0028443 A1* | 1/2013 | Pance .................... G06F 3/167 |
| | | 381/107 |
| 2013/0041665 A1 | 2/2013 | Jang et al. |
| 2013/0043977 A1 | 2/2013 | Velius et al. |
| 2014/0003611 A1 | 1/2014 | Mohammad et al. |
| 2014/0114665 A1 | 4/2014 | Murgia |
| 2014/0310031 A1 | 10/2014 | Ricci |
| 2015/0191152 A1 | 7/2015 | Gennermann |
| 2015/0287423 A1 | 10/2015 | Burke et al. |
| 2016/0171989 A1 | 6/2016 | Gupta et al. |
| 2016/0240181 A1* | 8/2016 | McNutt ................ G10K 11/002 |

* cited by examiner

IDENTIFICATION AND AUTHENTICATION IN A SHARED ACOUSTIC SPACE

I. CROSS REFERENCE TO RELATED APPLICATIONS

The present application claims benefit of U.S. Provisional Patent Application No. 62/091,386, entitled "ENHANCED VOICEPRINT IDENTIFICATION AND COMMAND CUSTOMIZATION IN SHARED ACOUSTIC SPACE," filed Dec. 12, 2014, which is expressly incorporated by reference herein in its entirety.

II. FIELD

The present disclosure is generally related to identification and authentication in a shared acoustic space.

III. DESCRIPTION OF RELATED ART

Voice-based recognition and identification can pose challenges in a shared acoustic space where multiple people may be in close proximity. Additionally, spoken passwords or audio of a person can be recorded and replicated to circumvent the voice-based identification or authentication. One approach to limit circumvention of voice-based identification and authentication is to limit services to non-critical services. Another approach to limit circumvention is to combine voice-based identification and authentication with other types of identification or authentication.

IV. SUMMARY

According to an aspect of the disclosure, a system includes a memory configured to store data associated with a service that is available. The system also includes a microphone associated with an acoustic space and configured to receive an audio input produced by a person. The system further includes a sensor located within the acoustic space and configured to detect vibrations produced by the person. The system includes a processor coupled to the memory, to the microphone, and to the sensor. The processor is configured to conditionally authorize execution of the service requested by the person, the service conditionally authorized based on the audio input and the vibrations.

In another aspect, a method includes receiving, at a processor from a microphone associated with an acoustic space. The audio data is generated by the microphone based on an audio input produced by a person. The method also includes receiving, at the processor from a sensor located within the acoustic space. The vibration data is generated by the sensor based on vibrations produced by the person. The method further includes conditionally authorizing, by the processor, execution of a service requested by the person. The service is conditionally authorized based on the audio data and the vibration data.

In another particular aspect, a system includes means for storing data associated with a service that is available. The system further includes means for receiving an audio input produced by a person and generating audio data based on the audio input. The means for receiving is associated with an acoustic space. The system also includes means for detecting vibrations produced by the person and generating vibration data based on the vibrations. The means for detecting is located within the acoustic space. The system includes means for conditionally authorizing execution of a service requested by the person. The service is conditionally authorized based on the audio data and the vibration data. The means for conditionally authorizing is coupled to the means for storing data, the means for receiving, and the means for detecting.

In another aspect, a non-transitory computer readable medium includes computer-executable instructions that, when executed when executed by a processor, cause the processor to authenticate an audio input produced by a person and received at a microphone associated with an acoustic space. The audio input is authenticated based on vibrations produced by the person. The vibrations are received at a sensor located within the acoustic space. The instructions further cause the processor to conditionally authorize execution of a service requested by the person. The service is conditionally authorized based on the audio input and the vibrations.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects, advantages, and features of the present disclosure will become apparent after review of the entire application, including the following sections: Brief Description of the Drawings, Detailed Description, and the Claims.

V. BRIEF DESCRIPTION OF THE DRAWING

The foregoing summary, as well as the following detailed description of illustrative implementations, is better understood when read in conjunction with the appended drawings. For the purpose of illustrating the implementations, there are shown in the drawings example constructions of the implementations; however, the implementations are not limited to the specific methods and instrumentalities disclosed. In the drawings.

VI. DETAILED DESCRIPTION

Particular aspects of the present disclosure are described below with reference to the drawings. In the description, common features are designated by common reference numbers throughout the drawings. As used herein, "exemplary" may indicate an example, an implementation, an aspect, or a combination thereof, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As referred to herein, a "sensor" may be a sensor that may detect or, in combination with a processor determine, an attribute. The attribute may include or correspond to vibration, mass, capacitance, weight, pressure, acceleration, weight distribution, pressure distribution, or a combination thereof, as illustrative non-limiting examples.

Figure 1:
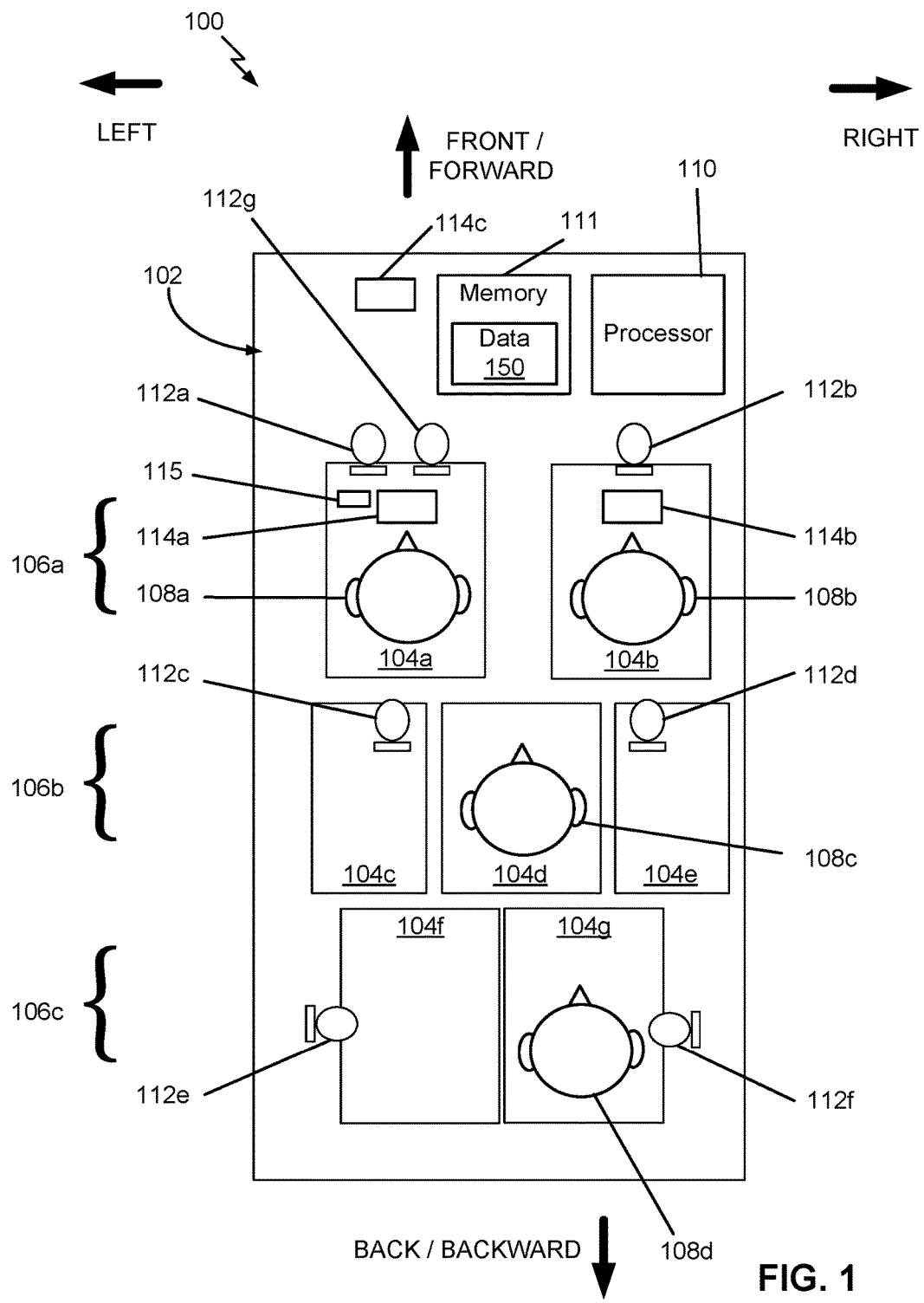
FIG. 1 is a diagram that illustrates a system for conditionally authorizing a service in a shared acoustic space.

FIG. 1 illustrates a particular example of a system 100 to enable a person to be conditionally authorized for a service, such as a voice-activated service. The system 100 may determine an identity based on audio inputs received at a plurality of microphones 112a-112g. The system 100 may verify that the audio inputs originated from a person and not a recording of the person based on vibrations detected at a plurality of sensors 114a-114c. The vibrations may be produced when the person speaks and the vibrations may be correlated (e.g., matched) to the audio input to verify the audio input is from the person. Vibrations generated from the recording may not be strong enough or may not be correlated (e.g., matched) to the audio input. The system 100 may be able to provide increased security by protecting from the use of a recording of a person to spoof voice-based identification and authentication. For example, the system 100 may verify the audio input based on the vibrations. The system 100 may be able to provide additional critical services and may be able to provide an increase in security using voice-identification and authentication.

The system 100 may be included in a shared acoustic space 102. The shared acoustic space 102 may be configured to accommodate one or more people. For example, multiple people may be in close proximity in the shared acoustic space 102. As an example, the shared acoustic space 102 may include or correspond to an interior compartment of a vehicle, such as an automobile, a plane, a ship, or a train. Additionally or alternatively, the shared acoustic space 102 may include or correspond to a non-transportation shared acoustic space. For example, the shared acoustic space may include or correspond to a concert hall, a theatre, a conference room, an office, as illustrative, non-limiting examples.

As described herein with reference to FIG. 1, the shared acoustic space 102 (e.g., an acoustic space) corresponds to the interior compartment of an automobile having seven seats 104a-104g arranged in three zones 106a-106c (e.g., rows). The interior compartment of the vehicle may be separated into (or may include) multiple zones 106a-106c. As described with reference to the system 100, each zone of the multiple zones 106a-106c corresponds to a different row of seats. In other implementation, each zone of multiple zones may correspond to a different seat of the multiple seats 104a-104g.

The seats 104a-104g may be configured to accommodate one person per seat. For example, in the configuration illustrated in FIG. 1, four people 108a-108d are in the shared acoustic space 102 and occupy seats 104a (e.g., a driver's seat), 104b (for a front-seat passenger), 104d (for a middle-row center-seat passenger), and 104g (for a third-row seat passenger on the vehicle-right side). Although the shared acoustic space has been described in terms of having seven seats 104a-104g in three zones (rows) 106a-106c, in other implementations the shared acoustic space 102 may include a different number of seats, a different number of zones (or rows), or a combination thereof. For example, the shared acoustic space 102 may include more than seven seats or fewer than seven seats.

The system 100 may include a processor 110, a memory 111, the plurality of microphones 112a-112g, and the plurality of sensors 114a-114c. Each of the plurality of microphones 112a-112g may be communicatively coupled to the processor 110. The plurality of microphones 112a-112g may be located in the shared acoustic space 102 and may be distributed throughout the shared acoustic space 102. For example, the plurality of microphones 112a-112g may be distributed throughout the shared acoustic space 102; in relation to the seats 104a-104g of the vehicle.

The plurality of microphones 112a-112g may be configured to receive audio inputs. For example, a first microphone 112a may be configured to receive a first audio input and a second microphone 112b may be configured to receive a second audio input. In some implementations, the audio inputs may be associated with the same source (e.g., the same person). For example, the first microphone 112a may receive the first audio input associated with a first person 108a at a first time and the second microphone 112b may receive the second audio input associated with the first person 108a at a second time. In some implementations, the first audio input (e.g., speech from the first person 108a) may have a different amplitude than the second audio input (e.g., the speech from the first person 108a). In other implementations, the audio inputs may be associated with different sources. For example, the first microphone 112a may receive the first audio input associated with the first person 108a and a third microphone 112c may receive a third audio input associated with a third person 108c.

In some implementations, more than one microphone may be provided for the driver, e.g., microphones 112a and 112g. For some implementations, no microphone may be specifically provided for a third person 108c in seat 104d (a middle-row center-seat) which instead may utilize both microphones 112c and 112d where the processor 110 is able to use data from both of these microphones to service all three seated positions in the second zone 106b (and likewise for the other rows if they were to have a third middle seat).

Each of the plurality of sensors 114a-114c may be communicatively coupled to the processor 110. The plurality of sensors 114a-114c may be located within and distributed throughout the shared acoustic space 102. For example, the plurality of sensors 114a-114c may be distributed throughout the shared acoustic space 102 in relation to the seats 104a-104g of the vehicle. Additionally or alternatively, the plurality of sensors 114a-114c may be located in a seat, on a seat, in a headrest, in a steering wheel, in a gear shifter, in a dashboard, or a combination thereof, as illustrative, non-limiting examples. In some implementations, each seat 104a-104g may include a corresponding sensor. In other implementations, at least one seat, such as the first seat 104a (e.g., a driver's seat), may include multiple sensors.

The plurality of sensors 114a-114c may be configured to detect vibrations. The vibrations detected by the plurality of sensors 114a-114c may be caused (e.g., generated) by a variety of sources in or around the shared acoustic space 102. For example, the vibrations may include engine vibrations from an engine of the vehicle, road vibrations cause by the vehicle in motion, music vibrations, vibrations caused by external sources outside of the shared acoustic space 102, or a combination thereof, as illustrative, non-limiting examples. Additionally or alternatively, the vibrations may be audio vibrations (e.g., speech vibrations) caused by a person speaking. For example, when a person speaks, audio vibrations are generated by the person's voice box. The audio vibrations may propagate through the air and via the person. The audio vibrations may also be transferred, such as from the person to an object (e.g., a seat or the sensor) that the person is in contact with. As another example, the audio vibrations propagating through the air may be transferred to an audio sensor, such as one of the plurality of microphones 112a-112g. Accordingly, in some situations, vibrations (e.g., audio vibrations) detected at a particular sensor may correspond to an audio input (e.g., the audio vibrations) detected at one of the plurality of microphones 112a-112g of the shared acoustic space 102.

In some implementations, the plurality of sensors 114a-114c may be configured to detect the vibrations, a mass, a weight, a pressure, an acceleration, a capacitance, a weight distribution, a pressure distribution, or a combination thereof, as illustrative non-limiting examples. The plurality of sensors 114a-114c may include or correspond to a seismic sensor, a vibration sensor, a pressure sensor, a load cell, an accelerometer, a piezoelectric sensors, a touchpad, or a combination thereof, as illustrative non-limiting examples.

The memory 111 may be coupled to the processor 110 and may be configured to store data 150, such as processor executable instructions, identity profiles, a command database, or a combination thereof, as illustrative non-limiting examples. Each identity profile of the identity profiles may include biometric information corresponding to a particular person. The identity profiles may include identity data used to identify the person and authentication data used to authenticate the person.

The identification data may include speech characteristic information (e.g., a voiceprint, a speech frequency range, or both), facial characteristic information, iris characteristic information, weight information, weight distribution pattern information, gesture information, fingerprint information, or a combination thereof. The authentication data may include the speech characteristic information (e.g., the voiceprint, a speech frequency range, or both), the facial characteristic information, the iris characteristic information, the weight information, the weight distribution pattern information, the gesture information, the fingerprint information, or a combination thereof. The authentication data may further include driving pattern characteristic information, specific privilege information, or a combination thereof.

The command database may include the available services (e.g., a plurality of services) of the system 100. The command database may associate the available service with certain spoken commands or key phrases. For example, the service of unlocking the doors of the vehicle may be associated with a spoken command of "unlock doors." In some implementations, the command database may also include service location information. The service location information may indicate a location or locations from which the system may authorize a person requesting the service. In some implementations, the system 100 may provide the service based on a determination that the location is within a particular zone of the plurality of zones. For example, the system 100 may provide the service of unlocking the doors of the vehicle in response to a command from the first person 108a in the first zone 106a and may not provide the service in response to a command from the third person 108c in the second zone 106b. Additionally or alternately, the command database may include levels of services (e.g., service levels), such as comfort services, restricted services, etc., and the memory 111 may be configured to store service level information. Each service level may require a different type of authentication. For example, a particular service (e.g., a comfort service) may be authorized based on biometric authentication (e.g., weight based authentication) and a restricted service may be authorized based on multi-modal biometric authentication (e.g., weight and facial based authentication).

The processor 110 may be configured to receive input data associated with the shared acoustic space 102. For example, the processor 110 may be configured to receive the audio data from (e.g., generated by) the plurality of microphones 112a-112g and configured to receive the vibration data from (e.g., generated by) the plurality of sensors 114a-114c, as illustrative, non-limiting examples. The processor 110 may be coupled to the plurality of microphones 112a-112g and the plurality of sensors 114a-114c via a wired connection, a wireless connection, or a combination thereof. For example, the processor 110 may be wirelessly coupled to the plurality of microphones 112a-112g and the plurality of sensors 114a-114c. To illustrate, the processor 110 may be wirelessly coupled to one or more of the plurality microphones 112a-112g using radiofrequency communication, Bluetooth communication, Wi-Fi communication, and other wireless communication technologies, as illustrative, non-limiting examples.

The processor may be configured to detect a request for a service. For example, the processor may perform speech recognition on a command spoken by the first person to identity a service associated with the command. The processor 110 may be configured to authorize the service based one or more inputs. The processor 110 may authorize the service before providing the service to ensure that a passenger, a location in the shared acoustic space 102, or a combination thereof, is authorized for the service. For example, the processor 110 may be configured to conditionally authorize the service based on the audio inputs (e.g. audio data) received by the plurality of microphones 112a-112g and the vibrations (e.g., vibration data) received by the plurality of sensors 114a-114c. The processor 110 may determine and identify of a person and verify the identity of person as described herein to make sure the audio input is actually speech provided by the person and not a recording.

The processor 110 may be configured to conditionally determine an identity of a person based on the input data, such as an audio data received from one of the plurality of microphones 112a-112g. For example, the processor 110 may determine a first identity of the first person 108a based first audio data received from the first microphone 112a. The processor 110 may determine the identity using voice-based identification, such as voiceprint identification, as an illustrative, non-limiting example. To illustrate, the processor 110 may determine a speech characteristic of the first audio data (corresponding to speech from the first person 108a). The processor 110 may access the memory 111 to retrieve stored speech characteristics information. The processor 110 may identify the identity corresponding to the first audio data based on a comparison of the speech characteristic and the stored speech characteristic information.

The processor 110 may be configured to verify the identity based on the vibration data received from the plurality of sensors 114a-114c. The processor 110 may verify the identity using vibration data from one or more sensors that are associated with a same seat, such as the first microphone 112a and the first sensor 114a. For example, in response to the processor 110 determining the identity using the first audio input from the first microphone 112a, associated with seat 104a, the processor 110 may verify the identity based on the first vibration data. For example, the processor 110 may verify the identity (determined based on the first audio data)

based on first vibration data receive from the first sensor 114a. To illustrate, the processor 110 may compare the first audio data to the first vibration data and determine whether the first vibration data correlates to or matches the first audio data. As one illustrative example, the processor 110 may compare the audio data to the vibration data to generate a correlation value. The correlation value may include or correspond to a difference between the audio data and the vibration data. The processor 110 may conditionally authorize ignition of the engine of the vehicle based on the correlation value being greater than or equal to a threshold. In response to the correlation value being less than or equal to the threshold, the processor 110 may be configured to provide an indication of a denial of the service. If the first vibration data is correlated to (e.g., matches) the first audio data, the processor 110 may determine that the identity is verified. If not, or provide the indication of the denial of the service via a user interface, such as a display. For example, the processor may enable playback of a sound or provide the indication of the denial of the service via a user interface, such as a display.

In some implementations, the processor may verify the identity using other inputs (e.g., a weight input), including gestures, images, any of the inputs that are used for identification or a combination thereof. For example, the processor 110 may receive weight data from a first weight sensor, as described with reference to FIG. 2. The processor 110 may access the identity profile associated with identity, the identity profile including weight information, weight distribution pattern information, or a combination thereof. The processor 110 may compare the weight data to the weight information, the weight distribution pattern information, or a combination thereof, to generate a correlation value. The processor 110 may conditionally authorize a service based on the correlation value being greater than or equal to a threshold. As another example, the processor 110 may perform facial recognition to verify the identity of the person based on an image (e.g., image data), as described with reference to FIG. 3. As another example, the processor 110 may perform gesture recognition to verify the identity of the person based on an image (e.g., image data) of a gesture by the person, as described with reference to FIG. 3.

The processor 110 may be configured to provide (or initiate) the service after authorizing the service. For example, the processor 110 may be configured to start the engine of the vehicle in response to the authorization of the service. As another illustrative example, processor 110 may be configured to start the engine of the vehicle in response to a user input. The user input may include an activation of a switch, a voice-based command, or a gesture. The processor 110 may conditionally authorize ignition of the engine of the vehicle. In some implementations, the processor 110 may provide the service based on the location of the person speaking the command. For example, the processor 110 may adjust a climate control setting for the entire vehicle (e.g., zones 106a-106c) in response to the first person 108a, seated in the first seat 104a, issuing a command and may adjust a climate control setting for the second zone 106b in response to the third person 108c, seated in the fifth seat 104e, issuing the command. In various implementations, the processor 110 may authorize the service based on the service level. For example, a first service level (e.g., a comfort service) may be authorized based on biometric authentication (e.g., weight based authentication) and a second service level (e.g. a restricted service) may be authorized based on multi-modal biometric authentication (e.g., weight and facial based authentication).

In some implementations, the processor 110 may be located in the shared acoustic space 102. For example, the processor 110 may be centrally located in the shared acoustic space 102. As another example, the processor 110 may include multiple processors and the multiple processors may be distributed throughout the shared acoustic space 102. In other implementations, the processor 110 may be located outside of, or remote from, the shared acoustic space 102. Regardless of location, the processor 110 may be operatively coupled (e.g., configured to receive) to various diverse inputs, such as sound data, vibration data, weight data, image capture data, user interface data, wireless communication data, etc., as an illustrative, non-limiting example.

During operation of the system 100, the first person 108a seated in a first seat 104a (e.g., the driver seat) may speak a command, such as "start the car." Multiple microphones of the plurality of microphones 112a-112g may receive the command as audio inputs and provide the audio inputs (or corresponding audio data) to the processor 110. For example, the first microphone 112a of the plurality of microphones 112a-112g may receive a first audio input and the second microphone 112b of the plurality of microphones 112a-112g may receive a second audio input. The first microphone 112a may provide the first audio input to the processor 110 as first audio data and the second microphone 112b may provide the second audio input as second audio data to the processor 110. In some implementations, each of the first audio data and the second audio data may include a corresponding timestamp. For example, the first audio data may include a first timestamp that indicates when the first audio input was received. As another example, the second audio data may include a second timestamp that indicates when the second audio input was received.

The processor 110 may detect the command in the audio data. For example, the processor 110 may perform speech recognition (e.g., such as acoustic modeling or language modeling) on a command spoken by the first person 108a to identify a service associated with the command. As one example illustration, the processor 110 may analyze the command to generate an acoustic model of the command. The processor 110 may compare the acoustic model to the command database to detect the command in the audio data.

The processor 110 may determine an identity of a person based on the first audio data, the second audio data, or both. To illustrate, the processor 110 may determine a first identity based on the first audio data using voiceprint identification from a plurality of identities stored at the memory 111. In some implementations, the processor 110 may determine the first identity based on a particular word, such as a password or passphrase, detected in the first audio data. For example, the memory 111 may store a table of passwords (or passphrases) and corresponding identities and/or user profiles. To illustrate, the table may be indexed using the passwords (or passphrases). The processor 110 may compare the particular word to the indexed passwords (or passphrases). In response to a match between the particular words and one of the indexed passwords (or passphrases), the processor 110 may retrieve the corresponding identity and/or user profile.

The processor 110 may be configured to determine a location (e.g., a seat of the plurality of seats 104a-104g) associated with an audio source, such as the first person 108a based on the received audio data. For example, the processor 110 may compare the first timestamp to the second timestamp. The processor 110 may determine that the audio source (e.g., the first person 108a) is in the first seat 104a in the first zone 106a based on the first time (corresponding to the first audio data generated by the first microphone 112a)

being earlier than the second time (corresponding to the second audio data generated by the second microphone 112b). Additionally or alternatively, the processor 110 may determine the location based a comparison of amplitudes (e.g., magnitudes) of the first audio data and the second audio data. For example, the processor 110 may determine that the audio source (e.g., the first person 108a) is in the first seat 104a in the first zone 106a based on a first amplitude (e.g., a peak amplitude or an average amplitude) of the first audio data being greater than a second amplitude (e.g., a peak amplitude or an average amplitude) of the second audio data.

The processor 110 may use the identified location to select vibration data received from a particular sensor that corresponds to the location (e.g., the first seat 104a). For example, based on the location being associated with the first seat 104a, the processor 110 may select the first vibration data received from the first sensor 114a. The processor 110 may use the first vibration data to verify the identity determined based on the first audio data, the second audio data, or a combination thereof.

To illustrate, the first vibration data may include a first component (e.g., a speech component) that corresponds to speech vibrations generated by the audio source, such as the first person 108a. Additionally or alternatively, the first vibration data may include a second component (e.g., a non-speech component) that corresponds to non-speech vibrations. The processor 110 may verify the identity based on the first audio input and the first vibration data, such as the first component (e.g., the speech component) of the first vibration data. To illustrate, the processor 110 may compare the first audio data to the first vibration data to generate a first correlation value. The correlation value may include a difference or deviation of between the first vibration data and the first audio data. The processor 110 may compare the correlation value to a threshold to verify the identity. The processor 110 may verify the identity and conditionally authorize the service based on the correlation value being greater than or equal to the threshold.

In some implementations, the processor 110 may be configured to filter the second component (e.g., the non-speech component) from the first vibration data to generate modified vibration data that primarily includes the first component (e.g., the speech component). For example, processor 110 may filter (e.g., remove) the first vibration data to remove data associated with a range of frequencies that correspond to non-speech content, such as a range of frequencies that are distinct from a set of frequencies that correspond to human speech. To illustrate, the processor 110 may remove (or filter out) noise vibrations with frequencies above a first filter threshold and with frequencies below a second filter threshold. Additionally or alternatively, the processor 110 may generate the modified vibration data based on second vibration data corresponding to another sensor, such as a third sensor 114c. For example, the third sensor 114c may be positioned in the shared acoustic space 102 so that the third sensor 114c detects non-speech vibrations. To illustrate, the third sensor 114c may be located near an engine of the vehicle to detect engine vibrations, near a wheel of the vehicle to detect road vibrations, or both. The processor 110 may receive third vibration data from the third sensor 114c and may subtract the third vibration data from the second vibration data to generate the modified vibration data. Although the processor 110 is described as generating the modified vibration data, in some implementations, the first sensor 114a may be configured to generate the modified vibration data and to provide the modified vibration data to the processor 110. The processor 110 may determine the correlation value base on the modified vibration data and the first input data.

The processor 110 may provide the service after authorizing the service. For example, the processor 110 may be configured to start the engine of the vehicle in response to the authorization of the service for the first person 108a. As another illustrative example, processor 110 may be configured to start the engine of the vehicle in response to an input from the first person 108 via the user interface.

In some implementations the processor 110 may be configured to authorize the service further based on the service location data. For example, the processor 110 may access the service location data associated with the service from the memory 111. The service location data may indicate valid locations in the shared acoustic space (e.g., the first zone 106a) from which a person may request the service and the processor may authorize the service. For example, the processor 110 may determine that the service (e.g., ignition of the engine) may be authorized from the location (e.g., the driver location) based on the service location data.

In some implementations, the identity may be provided to the processor 110 before speaking the command and the processor 110 may be configured to authenticate the identity based on the audio input and verify audio based on vibrations. For example, the processor 110 may be configured to detect a key fob associated with the first person 108a. The key fob may include may include an identity code that is associated with a person (e.g., the first person 108a). The processor 110 may able to receive the identity code, such as by radio frequency identification (RFID). The processor may compare the identity code to the identity profiles to determine the identity of the first person 108a. The processor 110 may then verify the identity based on audio data, vibration data or both.

As another example of operation of the system 100, the second person 108b, seated in seat 104b in first zone 106a, may be alone in the shared acoustic space 102 and the engine of the vehicle may be off. The second person 108b may play a recording of the first person 108a speaking the command, "start the car." The second microphone 112b of the plurality of microphones 112a-112g may receive a second audio input corresponding to the recording ("start the car") of the first person 108a. The second audio input may be provided to the processor 110 as third audio data. In some implementations, the second sensor 114b may be configured to generate second vibration data. The second vibration data may not include a second audio vibration component that corresponds to the second audio input. The second sensor 114b may provide the second vibration data to the processor 110. The second vibration data may have been generated by the second sensor 114b at the same time that the second microphone 112b generated the third audio data. In other implementations, the first sensor 114a, the second sensor 114, or both, may not receive the second vibration data (or the second audio vibration component) because vibrations generated by the recording of the first person 108a may be too weak to be detected by the first sensor 114a or the second sensor 114.

The processor 110 may determine a second identity (corresponding to the first person 108a) and a second location (e.g., the second seat 104b) based on the third audio data. The processor 110 may verify the second identity based on the second vibration data received from the second sensor 114b. For example, the processor 110 may attempt to verify by comparing the third audio data to the second vibration data (or a lack of the second vibration data) to generate a second correlation value. The processor 110 may compare the second correlation value to the threshold. The processor 110 may provide the indication of denial of the service based on the second correlation value being less than the threshold.

In some implementations, the system 100 may include a touchpad coupled to the one or more of the plurality of sensors 114a-114c. The touchpad may be configured to activate one or more sensors of the plurality of sensors 114a-114c to receive the vibrations. For example, in response to the touchpad detecting contact (e.g., detecting a measured capacitance value is greater than or equal to a detection threshold), the one or more sensors of the plurality of sensors 114a-114c may be activated. The touchpad may be located in close proximity to one or more of the plurality of sensors 114a-114c, or may be remotely located from the one or more of the plurality of sensors 114a-114c. In some implementations, a particular sensor may be configured to receive vibrations via the touchpad, such as while a person is in contact with (e.g., touching) the touch pad. To illustrate, the touchpad may be positioned on a steering wheel of the vehicle and the particular sensor may be located in the steering wheel and coupled to the touchpad.

In various implementations, the sensor may detect or determine a combination of attributes, e.g., vibration and mass. This may be accomplished with a single sensor, a plurality of a single type of sensor, a plurality of multiple types of sensors, an array of a single type of sensors in a particular area, e.g., seat 104a. For example, when the first sensor 114a is located in the first seat 104a, the first sensor 114a may detect the first vibrations and a first mass.

In some implementations, the processor 110 may further authorize the service based on the command or a type of command. The processor 110 may authorize the service based on command privileges stored in the identity profiles. For example, the third person 108c may be the owner of the vehicle and the command privileges of the identity profile of the third person 108c may authorize the third person 108c for services independent of the location of the third person 108c. For example, the processor 110 may authorize the third person 108c for a service that may otherwise not be available to the location, such as the second zone 106b or the seat 104e. To illustrate, the processor 110 may authorize a service (e.g., unlocking doors) for the third person 108c when the service may otherwise be restricted to a specific location, such as the first zone 106a.

In other implementations, the shared acoustic space 102 may include or correspond to a non-transportation shared acoustic space, such as a conference room. The office may include the first person 108a, in a first zone, and the second person 108b in a second zone. The first person may have rights to lock doors, turn on and turn off lights, close window blinds, etc. For example, a first microphone may receive an audio input of the first person 108a, and a first sensor, corresponding to the first zone, may detect vibrations. The processor 110 may receive the audio data from the first microphone and identify the first person 108a. The processor 110 may receive the vibration data from the first sensor and verify the identity. The processor 110 may authorize locking a door to the office based on audio input of the first person 108a.

In some implementations, the system 100 may be configured to retrieve an identity profile from a remote database. Additionally or alternatively, the system 100 may be configured to create an identity profile in response to receiving a request via a user interface. For example, the processor 110 may be configured to receive a user input via the user interface and may be configured to receive identity data via one or more sensors of the system 100. The identity data may include or correspond to the voiceprint model, the audio input, the vibrations, an image input, a weight input, a weight distribution pattern, a pressure distribution pattern, or a combination thereof. Additionally, the processor 110 may be configured to receive authentication data via one or more sensors of the system 100 in response to the user input.

The authentication data may include or correspond to the vibrations, an image input, a weight input, a weight distribution pattern of the person, or a combination thereof. The processor 110 may be configured to store the identity data and the authentication data at the memory 111. To illustrate, the processor 110 may receive a request from the first person 108a, such as the first person speaking "create profile." The processor 110 may prompt the first person via the user interface to speak various phrases. The processor 110 may receive multiple audio inputs (e.g., the various phrases) of the first person 108a to be stored as identity data at the memory 111. The processor 110 may also receive weight distribution pattern data of the first person 108a from a plurality of weight sensors (e.g., a plurality of second weight sensors). The processor 110 may generate weight distribution information based on the weight distribution pattern data and store the weight distribution information. The processor 110 may create the identity profile and store the identity data and authentication data at the memory 111. In other implementations, the processor 110 may send the identity profile to the remote database for storage via wireless communication. In some implementations, the identity data may include vibration profile information. For example, the processor 110 may receive the vibrations corresponding to the audio inputs (e.g., the various phrases). The processor 110 may determine one or more vibration characteristics based on the vibrations and the processor 110 may store the one or more vibration characteristics at the memory 111 as vibration profile information.

One advantage provided by at least one of the disclosed aspects is an increase in security and safety when providing critical and restricted services in a shared acoustic space using voice-based identification and authentication. For example, determining an identity based on speech recognition and verifying the identity based on vibrations may provide an increase in security and safety over voice-based recognition alone. Additionally, authorizing the service further based on an identity profile, a location, or both, may further increase the security and safety when providing critical and restricted services in a shared acoustic space.

Figure 2:
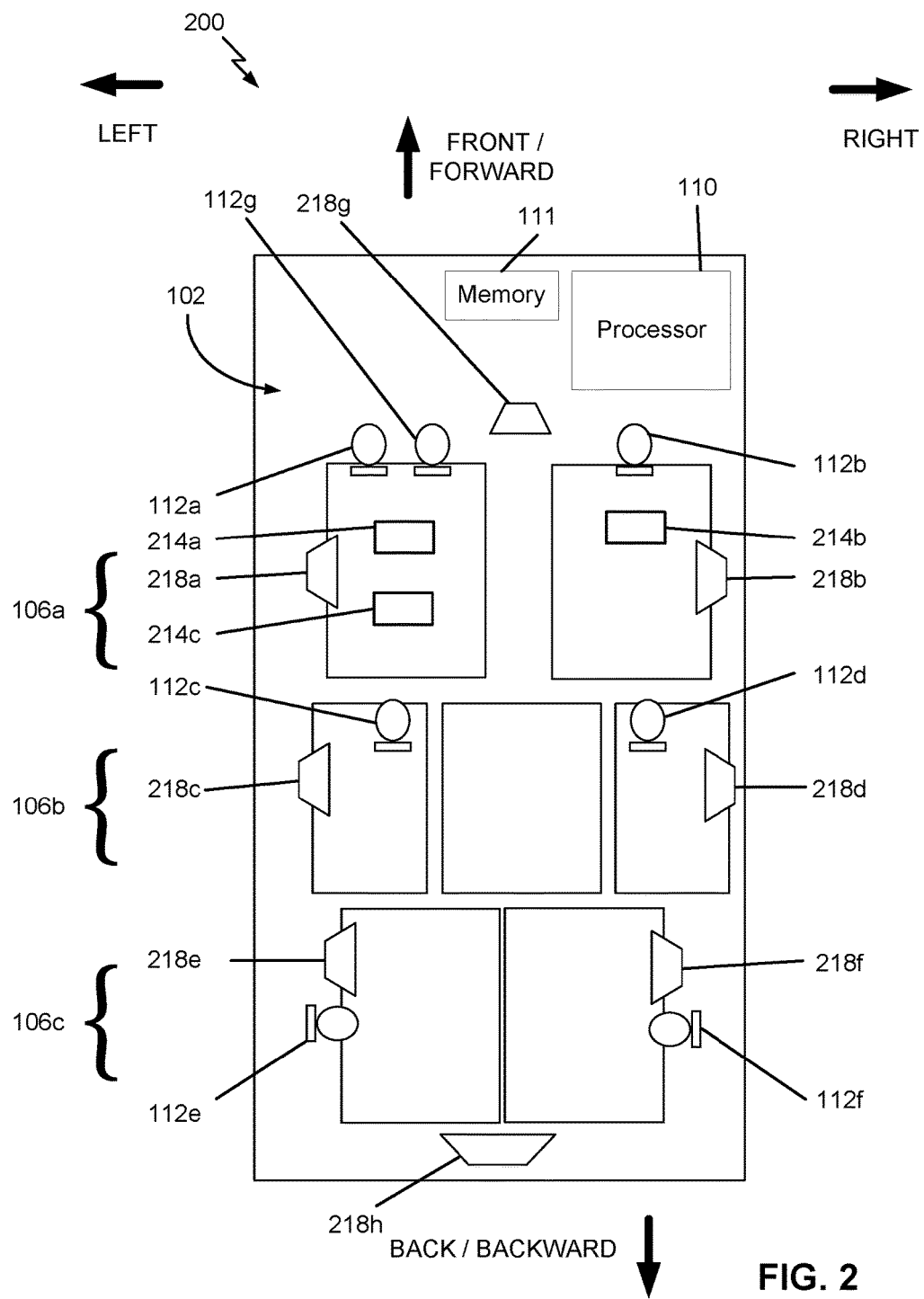
FIG. 2 is a diagram that illustrates a particular example of a system for conditionally authorizing a service in a shared acoustic space.

FIG. 2 illustrates a particular example of a system 200 that includes the shared acoustic space 102 of FIG. 1. The system 200 includes a plurality of weight sensors 214a-214c and a plurality of loudspeakers 218a-g. The system 200 may also include the plurality of sensors 114a-114c (not shown). The system 200 may be configured to conditionally authorize a service based one or more of the plurality of weight sensors 214a-214c. In some implementations, the system may conditional authorize the service after a first verification of an identify based on data generated by one of the plurality of sensors 114a-114c, as described with reference to the system 100 of FIG. 1, and a second verification of the identify based on weight data generated by at least one of the weight sensors 214a-214c, as described herein. The system 200 may provide the service via the plurality of loudspeakers 218a-218h located throughout the shared acoustic space 102.

The plurality of weight sensors 214a-214c may be coupled to the processor 110. Each weight sensor may be configured to detect a weight value (e.g., receive a weight input). Each weight sensor may also be configured to provide weight data corresponding to the weight value to the processor 110. The plurality of weight sensors 214a-214c may be distributed throughout the shared acoustic space 102. For example, the weight sensors may be located in a seat, in a seat-back, in a headrest, in an armrest, in a floor. In some implementations, one or more of the plurality of weight sensors 214a-214c may be configured in array, such as the first weight sensor 214a and the second weight sensor 214b. In other implementations, each seat of the shared acoustic space 102 may have one or more weight sensors configured to capture weight inputs and weight distribution patterns.

Weight values detected by an array or a group of weight sensors may indicate a weight distribution. For example, the first seat 104a may be associated with a first weight sensor 214a located in the seat and the second weight sensor 214b located in the seat-back. The first weight sensor may detect a first weight value and the second 214a sensor may detect a second weight value which may indicate a seated weight distribution. As another example, the first seat 104a may be associated with a first weight sensor 214a located in the floor and the second weight sensor 214b located in the floor. The first weight sensor may detect a first weight value and the second weight sensor 214b may detect a second weight value which may indicate a shoe size.

In some implementations, one or more of the plurality of weight sensors 214a-214c, may include or correspond to a pressure sensor configured to detect a pressure input. For example, the second weight sensor 214b may be a pressure sensor. The pressure sensor may provide pressure data (e.g., the pressure input) to the processor 110. As another example, the first weight value of the first weight sensor 214a and the second weight value of the second weight sensor 214b may be used to determine a pressure value or a pressure distribution.

The processor 110 may be configured to determine a weight distribution pattern based on the first weight value and the second weight value (e.g., weight distribution data). In other implementations, the processor 110 may be configured to receive the weight distribution pattern from the plurality of weight sensors 214a-214c. In some implementations, the processor 110 may be configured to determine a pressure value based on the weight data or the pressure data. Additionally or alternatively, the processor 110 may be configured to determine a pressure distribution pattern based on the weight data or the pressure data. In other implementations, when the plurality of weight sensors 214a-214c correspond to pressure sensors, the processor 110 may be configured to receive the pressure distribution pattern from the plurality of weight sensors 214a-214c.

The processor 110 may be configured to compare the weight values to stored weight information associated with the identity of the person to generate a correlation value. The processor 110 may be configured to verify an identity of a person in response to the correlation value being greater than or equal to a threshold. The processor 110 may be configured to not authenticate the person in response to the correlation value being less than the threshold. In some implementations, the processor 110 may be able to calculate a shoe size best on the weight inputs from the plurality of weight sensors 214a-214c.

Additionally or alternatively, the processor 110 may be configured to compare the weight distribution pattern to stored weight distribution pattern information associated with the identity of the person to generate a correlation value. The processor 110 may be configured to authenticate the person in response to the correlation value being greater than or equal to a threshold. The processor 110 may be configured to not authenticate the person in response to the correlation value being less than the threshold.

During operation, of the system 200, the person seated in the driver seat (e.g., the leftmost seat of the first zone 106a) may speak a command, such as "start the car." Multiple microphones of the plurality of microphones 112a-112g may receive the command as audio inputs and provide the audio inputs (or corresponding audio data) to the processor 110. For example, the first microphone 112a of the plurality of microphones 112a-112g may receive a first audio input and the second microphone 112b of the plurality of microphones 112a-112g may receive a second audio input. The first microphone 112a may provide the first audio input to the processor 110 as first audio data and the second microphone 112b may provide the second audio input as second audio data to the processor 110.

The processor 110 may detect the command in the audio data. For example, the processor 110 may perform speech recognition (e.g., such as acoustic modeling or language modeling) on a command spoken by the first person 108a to identify a service associated with the command. Additionally, the processor 110 may determine an identity and a location of a person based on the first audio data, the second audio data, or both, as described with reference to the system 100 of FIG. 1.

The processor 110 may use the identified location to select weight data received from a particular weight sensor that corresponds to the location (e.g., the driver seat). For example, based on the location being associated with the driver seat, the processor 110 may select the first weight data received from the first weight sensor 214a. The processor 110 may use the first weight data to verify the identity determined based on the first audio data, the second audio data, or a combination thereof.

The processor 110 may verify the identity based on the first audio input and the first weight data. If the first weight sensor 214a is a first weight sensor and the first weight input data is weight data, the processor 110 may access the identity profile associated with identity. The identity profile may include weight information, weight distribution pattern information, or a combination thereof. The processor 110 may compare the weight data to the weight information, the weight distribution pattern information, or a combination thereof, to generate a correlation value. The processor 110 may conditionally authorize ignition of the engine of the vehicle based on the correlation value being greater than or equal to a threshold.

In some implementations, the processor 110 may determine a weight distribution pattern based on the weight inputs. The weight distribution pattern may include or correspond to individual weight values, a total weight, an average weight, as non-limiting examples. In some implementations, the weight distribution pattern may define an area. For example, a group of weight sensors located in the floor may indicate a shoe size. The processor 110 may access the identity profile associated with identity, the identity profile including the weight distribution pattern information. The processor 110 may compare the weight distribution pattern to the weight distribution pattern information, to generate a correlation value. The correlation value may be a difference, an average, a deviation, as non-limiting examples. The processor 110 may conditionally authorize ignition of the engine of the vehicle based on the correlation value being greater than or equal to a threshold.

The processor 110 may provide the service after authorizing the service. For example, the processor 110 may be configured to start the engine of the vehicle in response to the authorization of the service for the first person 108a. In some implementations, the plurality of loudspeakers 218a-218h may be arranged in any of several different configurations, such as the 7.1 surround sound system arrangement illustrated in FIG. 2. The plurality of loudspeakers 218a-218h may be communicatively coupled to the processor 110. In some implementations where the processor is remotely located from the shared acoustic space 102, the plurality of loudspeakers 218a-218h may be coupled by wireless communication as described above. The plurality of loudspeakers 218a-218h may be configured to provide the indication of denial of a service.

Additionally or alternatively, the plurality of loudspeakers 218a-218h may be configured to provide one or more services, such as a personalized audio services. For example, the processor 110 may be configured to generate audio outputs for reproduction by one or more of the plurality of loudspeakers 218a-218g. To illustrate, the processor may output music via the loudspeakers 218e and 218f for a person seated in the second zone 106b. In other implementations, the service may include or correspond to driver notifications. To illustrate, the processor 110 may output the driver notifications via the plurality of loudspeakers 218a-218d, such as speech or sounds that indicate the nature and direction of a hazard detected by a hazard detection system (e.g., a blind spot detection system).

In some implementations, pairs of loudspeakers located in each row, such as loudspeakers 218a and 218b in the first zone 106a (e.g., a first row), may provide multichannel (i.e., stereo) output for a music player. In other implementations, the plurality of loudspeakers 218a-218h may operate to provide surround sound for music, movie soundtracks, or other surround sound media. In some implementations, the processor 110 can balance audio input received from another party during a conference call to indicate a nature and direction of the audio input. For example, the processor 110 may provide audio output via the loudspeakers 218c and 218e to indicate the nature (e.g., the audio originated from the back left) and the direction (e.g., the audio directed at the back right) of the audio input. Regardless of the specific locations or configuration of the microphones 112a-112g within the shared acoustic space 102, the processor 110 can act to balance sounds across the vehicle by taking sounds generated from any part of the vehicle—received as inputs at one or more of the microphones 112a-112g—and reproducing these sounds on one, a set, or subset of loudspeakers 218a-2184h in the other parts of the vehicle akin to a multi-input/multi-output public address system. For example, the microphones 112e and 112f may receive audio inputs from a fourth person 108d in the third zone 106c. The processor 110 may reproduce the audio input as audio output via the loudspeakers in the first zone 106a, such as the loudspeakers 218a, 218b, and 218g.

In some implementations, the processor 110 may verify the identify using multiple verification approaches prior to authorizing the service. For example, the processor 110 may verify the identify based on a combination of two or more of a first verification based on data (as described with reference to the system 100 of FIG. 1), a second verification based on weight data, a third verification based on audio data, or another varication approach, as illustrative, non-limiting examples. Using multiple verification approaches may provide more confidence and security that the determined identity is correct.

One advantage provided by at least one of the disclosed aspects is an increase in security and safety when providing critical and restricted services in a shared acoustic space using voice-based identification and authentication. For example, determining an identity based on speech recognition and verifying the identity using weight based biometric information may provide an increase in security and safety over voice-based recognition alone. Additionally, authorizing the service further based on an identity profile, a location, or both, may further increase the security and safety when providing critical and restricted services in a shared acoustic space.

Figure 3:
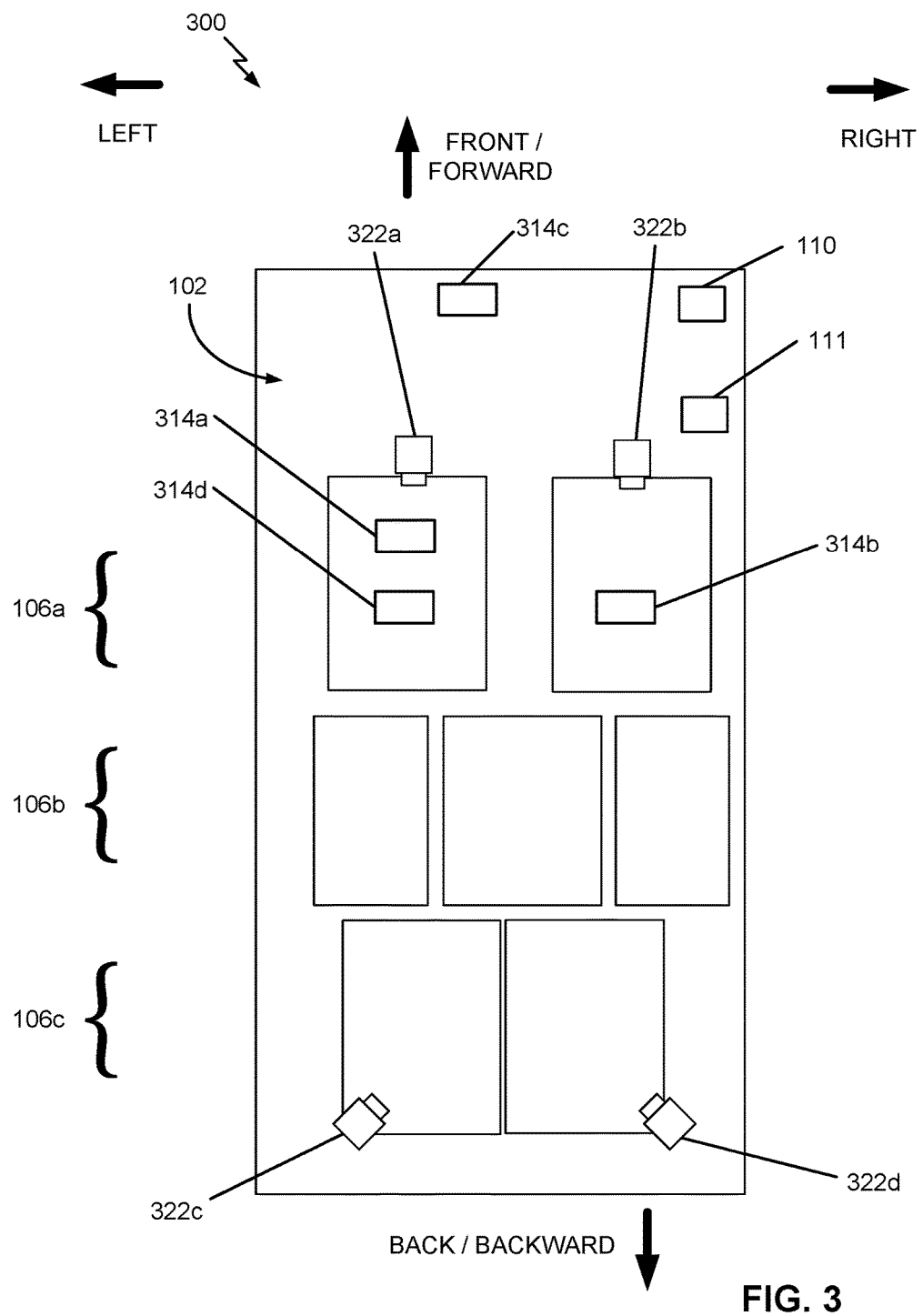
FIG. 3 is a diagram illustrating another example of a system for conditionally authorizing a service in a shared acoustic space.

FIG. 3 illustrates a particular example of a system 300 in the shared acoustic space 102 of FIGS. 1 and 2. In particular, the system 300 may enable conditional authorization of a service using inputs from at least one of a plurality of force sensors 314a-314d in combination with various other sensors, as described herein. The plurality of force sensors 314a-314d may include or correspond to the plurality of sensors 114a-114c of FIG. 1, the plurality of weight sensors 214a-214c of FIG. 2, or a combination thereof. The system 300 may also include the plurality of microphones 112a-112g of FIG. 1, the plurality of loudspeakers 218-a-218h of FIG. 2, or a combination thereof, all of which are not shown in FIG. 3 for clarity.

The system 300 may include a plurality of image capture devices 322a-322d, such as a plurality of cameras. The plurality of image capture devices 322a-322d may be coupled to the processor 110. Each image capture device of the plurality of image capture devices 322a-322d may be configured to capture an image, a plurality of images (e.g. a video stream), or a combination thereof. In some implementations, a particular image capture device (e.g., a first image capture device 322a) may be configured to capture at least one image of a face of a person at a particular location (e.g., a particular seat) within the shared acoustic space 102.

The processor 110 may be configured to authenticate (e.g., verify) an identity of a person on data, as described with reference to the system 100 of FIG. 1. The processor 110 may further be configured to authenticate (e.g., verify) the identity based on image data received from a particular image capture device of the plurality of image capture devices 322a-322. The identity may include or correspond to profile image data of the person. For example, the processor 110 may be configured to generate an image correlation value between the profile image data and the image data received from the particular image capture device. The processor 110 may be configured to authenticate (validate) the identity based on the image correlation value satisfying a threshold. For example, the image correlation value may satisfy the threshold if the image correlation value is greater than or equal to the threshold.

Additionally or alternatively, the processor 110 may be configured to identify a gesture. For example, the image capture devices 322a-322d may be configured to capture an image of a gesture by a person at the location. The processor 110 may be configured to perform image segmentation, motion detection, video tracking or a combination thereof, to identify the gesture. The processor 110 may be configured to match or correlate the gesture to a stored gesture data associated with the identity, such as gesture data stored in the memory 111 (or at a remote database). If the gesture detected by the processor 110 corresponds to (e.g., matches) the gesture data, the processor 110 may determine that the identity is validated.

During operation, of the system 300, a person seated in the driver seat (e.g., the leftmost seat of the first zone 106a)

may speak a command, such as "start the car." Multiple microphones of the plurality of microphones 112a-112g may receive the command as audio inputs and provide the audio inputs (or corresponding audio data) to the processor 110. For example, the first microphone 112a of the plurality of microphones 112a-112g may receive a first audio input and the second microphone 112b of the plurality of microphones 112a-112g may receive a second audio input. The first microphone 112a may provide the first audio input to the processor 110 as first audio data and the second microphone 112b may provide the second audio input as second audio data to the processor 110.

The processor 110 may detect the command in the audio data. For example, the processor 110 may perform speech recognition (e.g., such as acoustic modeling or language modeling) on a command spoken by the first person 108a to identify a service associated with the command. Additionally, the processor 110 may determine an identity and a location of a person based on the first audio data, the second audio data, or both, as described with reference to the system 100 of FIG. 1.

The processor 110 may use the identified location to select image data received from a particular image capture device that corresponds to the location (e.g., the driver seat). For example, based on the location being associated with the driver seat, the processor 110 may select the first image capture data received from the first image capture device 322a. The processor 110 may use the first image capture data to verify the identity. In response to verifying the identity based on the first image capture data, the processor 110 may authorize the requested service.

In some implementations, the processor 110 may verify the identify using multiple verification approaches prior to authorizing the service. For example, the processor 110 may verify the identify based on a combination of two or more of a first verification based on data, a second verification based on weight data, a third verification based on audio data, a fourth verification based on image data, or another varication approach, as illustrative, non-limiting examples. In some implementations, verification of the other verification approach may include a sequence of inputs (e.g., a sequence of actions). Using multiple verification approaches may provide more confidence and security that the determined identity is correct.

In some implementations, determination of an identity and verification of the identity may be incorporated into a sequence of inputs (e.g., a sequence of actions). In such implementations, verification of the identity of a user (e.g., a person) may not occur unless each input is received by the processor 110 in the correct order. For example, the sequence of inputs, the processor 110 receiving brake data from a brake sensor at a first time in response to a brake pedal being depressed. After receiving the brake data indicating the brake pedal was depressed, the sequence of inputs may include the processor 110 may include the processor 110 receiving audio data indicating a particular word or sound from one of the plurality of microphones 112a-112g. The processor 110 may then determine a location of the user based on the audio data as described with reference to the system 100 of FIG. 1. For example, the processor 110 may determine a location relative to a source (e.g., a person) of the audio input in a three-dimensional space of a shared acoustic space 102. After the location is determined, the processor 110 may receive image capture data from the particular image capture device corresponding to the location. The person may perform a gesture that is captured by the particular image capture device. The processor 110 may identify the gesture (e.g., the user winking his or her right eye) based on the image capture data. The processor 110 may perform voiceprint identification on the command or phrase to determine an identity profile associated with the user. The processor 110 may determine whether the captured gesture matches stored gesture associated with the user profile that corresponds to the identity. If the processor 110 determines that the gesture matches the stored gesture, the sequence of inputs is completed and the identity is verified.

In some implementations, one or more video displays (not shown) might also be integrated into the shared acoustic space 102. For example, one or more displays may be incorporated into a dashboard (for persons in the first zone 106a), may be incorporated into the back side of headrests of the first and second row seats (for the second and third row persons), may drop down from the ceiling (for the center row middle person in particular), or a combination thereof. Additionally or alternatively, one or more seats included in the shared acoustic space 102 may be equipped with a tactile input device (not shown). For example, a tactile input device may include a keyboard, keypad, gamepad, trackball or touchpad, as illustrative, non-limiting examples. The tactile input device may enable the processor 110 to provide each person enhanced interaction with the features and capabilities across various media and senses.

One advantage provided by at least one of the disclosed aspects is an increase in security and safety when providing critical and restricted services in a shared acoustic space using voice-based identification and authentication. For example, determining an identity based on speech recognition and verifying the identity using facial recognition, a sequence of inputs, or both, may provide an increase in security and safety over voice-based recognition alone. Additionally, authorizing the service further based on an identity profile, a location, or both, may further increase the security and safety when providing critical and restricted services in a shared acoustic space.

Figure 4:
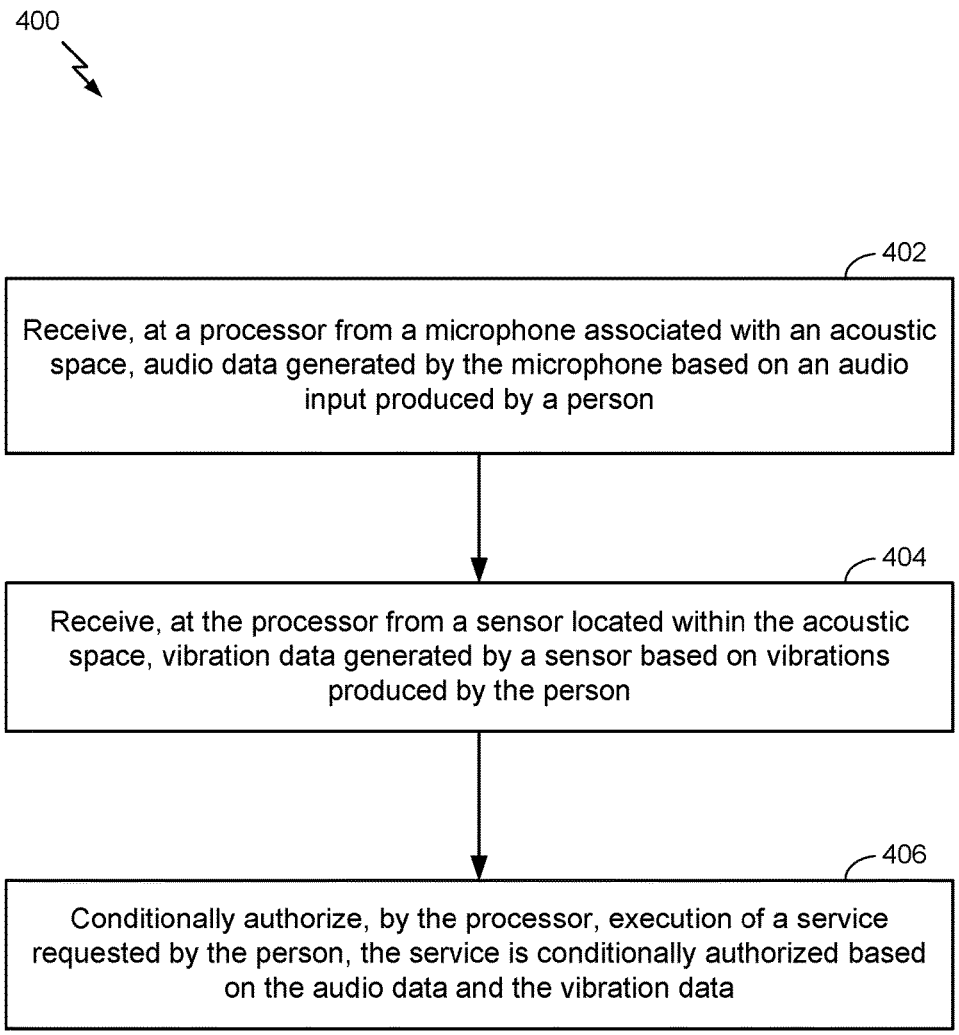
FIG. 4 is a flowchart that illustrates a first example of a method of conditionally approving a service.

FIG. 4 illustrates a particular example of a method 400 of conditionally authorizing a service for execution. The method 400 may be performed by one or more of the processors described above, such as the processor 110 of FIGS. 1-3. In a particular implementation, the method 400 may be performed by one or more of the systems described above, such as the system 100 of FIG. 1, the system 200 of FIG. 3, the system 300 of FIG. 3, or a combination thereof.

The method 400 includes receiving, at a processor from a microphone associated with an acoustic space, audio data generated by the microphone based on an audio input produced by a person, at 402. For example, the processor 110 of FIGS. 1-3 may receive the audio data from the first microphone 112a of the plurality of microphones 112a-112g, as described with reference to FIG. 1.

The method 400 also includes receiving, at the processor from a sensor located within the acoustic space, vibration data generated by a sensor based on vibrations produced by the person, at 404. For example, the processor 110 may receive the vibration data from the first sensor 114a of the plurality of sensors 114a-114c, as described with reference to FIG. 1, or from a first force sensor 314a of the plurality of force sensors 314a-314d, as described with reference to FIG. 3.

The method 400 further includes conditionally authorizing, by the processor, execution of a service requested by the person, the service is conditionally authorized based on the audio data and the vibration data, at 406. For example, the processor 110 may conditionally authorize ignition of the engine of the vehicle based on the first audio data and the vibration data, such as described with reference to FIG. 1. As another example, the service may include unlocking the vehicle, contacting an emergency service provider via a communication device associated with a person, providing personalized services.

In some implementations, the method 400 may include determining an identity of a person based on the audio data. For example, the processor 110 may determine an identity of the first person 108a based on the audio data, as described with reference to FIG. 1. The method 400 may also include authenticating the identity based on the vibration data. For example, the processor 110 may authenticate the first audio input based on the vibration data, as described with reference to FIG. 1. In some implementations, execution of the service may be authorized responsive to an authentication of the identity. For example, execution of the service, such as the ignition of the engine, may be authorized in response to the authentication of the identity. After authorization of execution of the service, the service may be may be provided (e.g., executed) in response to another input, such as the user input, as described with reference to FIG. 1.

In various implementations, the vibration data may include a noise component and an audio vibration component that corresponds to at least to the audio input generated by the person. For example, the vibration data may include the noise component (e.g., engine vibrations, road vibrations, etc.) and the audio vibration component that corresponds to the audio input, as described with reference to FIG. 1. The method 400 may include filtering the noise component from the vibration data to isolate the audio vibration component. For example, the processor 110 may filter the vibration data, received from the first sensor 114a, to attenuate or remove the noise vibrations (e.g., the noise component) that are outside of a range of frequencies corresponding to human speech. Filtering the vibration data to remove the noise component may produce (e.g., isolate) the audio vibration component, as described with reference to FIG. 1. The method 400 may also include comparing the audio data to the audio vibration component to generate a correlation value. For example, the processor 110 may compare the audio data to the audio vibration component to create the correlation value, as described with reference to FIG. 1. The method 400 may further include comparing the correlation value to a threshold. The service may be conditionally authorized in response to the correlation value being greater than or equal to the threshold. For example, the processor 110 may compare the correlation value to the threshold, as described with reference to FIG. 1.

In some implementations, the method 400 may include receiving second vibration data from a second sensor. The second vibration data may be associated with the noise component. For example, the processor 110 may receive the second vibration data associated with the noise component, as described with reference to FIG. 1. The method 400 also includes subtracting the second vibration data from the vibration data to produce (e.g., isolate) the audio vibration component. For example, the processor 110 may subtract the second vibration data from the vibration data to generate the audio vibration component.

In some implementations, the method 400 may include receiving weight data from a weight sensor. For example, the processor 110 may receive the weight data from the first weight sensor 214a of the plurality of weight sensors 214a-214c, as described with reference to FIG. 2. The method 400 may include determining a weight value based on the weight data. For example, the processor 110 may generate the weight value based on the weight input, as described with reference to FIG. 2. The method 400 may include comparing the weight value to stored weight information associated with an identity of the person to generate a correlation value. For example, the processor 110 may compare the weight value to the stored weight information associated with the identity of the first person 108a, as described with reference to FIG. 2. In some implementations, the identity may be determined based on the audio data. The method 400 further may also include authenticating the person in response to the correlation value being greater than or equal to a threshold. To illustrate, the processor 110 may authenticate the first person 108a in response to the correlation value satisfying the threshold (e.g., in response to the correlation value being greater than or equal to the threshold).

In some implementations, the method 400 may include receiving weight data from an array of weight sensors. For example, the processor 110 may receive the plurality of weight inputs from the plurality of weight sensors 214a-214c of FIG. 2 configured in an array. The method 400 may include generating weight distribution pattern data based on the weight data. The method 400 may include comparing the weight distribution pattern data to stored weight distribution pattern information that is associated with an identity of the person to generate a correlation value. For example, the processor 110 may compare the weight distribution pattern data to the stored weight distribution pattern information associated with the identity profile of the first person 108a stored in the memory 111, as described with reference to FIG. 2. In some implementations, the identity may be determined based on the audio data. For example, the processor 110 may determine the that the identity of the source of the audio input is the identity of the first person 108a, as described with reference to FIG. 2. The method 400 may further include authenticating the person in response to the correlation value being greater than or equal to a threshold.

In some implementations, the method 400 may include receiving a sequence of data inputs from one or more sensors. For example, the processor 110 may receive the sequence of data inputs from the one or more sensors. In various implementations, the sequence of data inputs includes the audio data, the vibration data, image data, brake sensor data, accelerator sensor data, radio sensor data, or a combination thereof, as illustrative, non-limiting examples. Conditionally authorizing execution of the service may be further based on the sequence of data inputs. For example, the processor 110 may conditionally authorize the service further based on the processor 110 receiving the sequence of data inputs in a particular order.

In some implementations, the method 400 may include receiving a first data input (of a particular sequence of data inputs) from a first sensor of the one or more sensors at a first time. In some implementations, the first sensor may include a brake sensor. The method 400 may include receiving a second data input (of the particular sequence of data inputs) at a second sensor of the one or more sensors at a second time. The second time may occur after the first time. In some implementations, the second sensor may include the first microphone 112a. The method 400 may include receiving a third data input at a third sensor of the one or more sensors at a third time. The third time may occur after the second time. In some implementations, the third sensor may include the first image capture device 324a.

In some implementations, the method 400 includes accessing driving pattern information associated with an identity of the person after conditionally authorizing execution of the service. In some implementations, the identity may be determined based on the audio data. As described with reference to FIG. 2, the processor 110 may access the driving pattern information, such as an average rate of acceleration, from the memory 111 or from the remote database. To illustrate, the processor 110 may receive acceleration data from an accelerometer and may determine a driving pattern characteristic based on the acceleration data. In some implementations, the average rate of acceleration may be determined based on the acceleration data.

The method 400 may include comparing the driving pattern characteristic to the driving pattern information to generate a correlation value. For example, the processor 110 may compare the average rate of acceleration from the acceleration data to the average rate of acceleration from the driving pattern information. To illustrate, the processor 110 may generate a difference between the average rate of acceleration from the acceleration data and the average rate of acceleration from the driving pattern information. The method 400 may include conditionally authorizing execution of a second service in response to the correlation value being greater than or equal to a threshold. For example, the processor 110 may provide an indication of abnormal or unsafe driving via the user interface, such as described with reference to FIG. 2.

As another example, the driving pattern characteristic may include an average rate of braking or an average rate of accelerating, such as described with reference to FIG. 3. The second service may include providing an indication of abnormal driving via the user interface.

In some implementations, the method 400 may include receiving a request to create an identity profile from the person via a user interface. For example, the processor 110 may receive a request from the first person 108a, via the user interface, to create an identity profile, such as described with reference to FIG. 3. The method 400 may include, after receiving the request, receiving identity data associated with a voiceprint model of the person and authentication data associated with weight distribution pattern data of the person. The method 400 may include storing the identity data and the authentication data in association with the identify profile of the person. To illustrate, the identify profile may be stored at the memory 111 at a remote sever (or remote data base), such as described with reference to FIG. 3.

By conditionally authorizing execution of the service (e.g., ignition of the engine) based on the audio data and the vibration data, the method 400 enables utilization of voice-based identification and authentication for critical or restricted services. Thus, the problems of false detection and spoofing, such as by playing a recorded voice, are reduced. As a result, the method 400 enables providing increased security and safety for voice-based identification and authentication.

Figure 5:
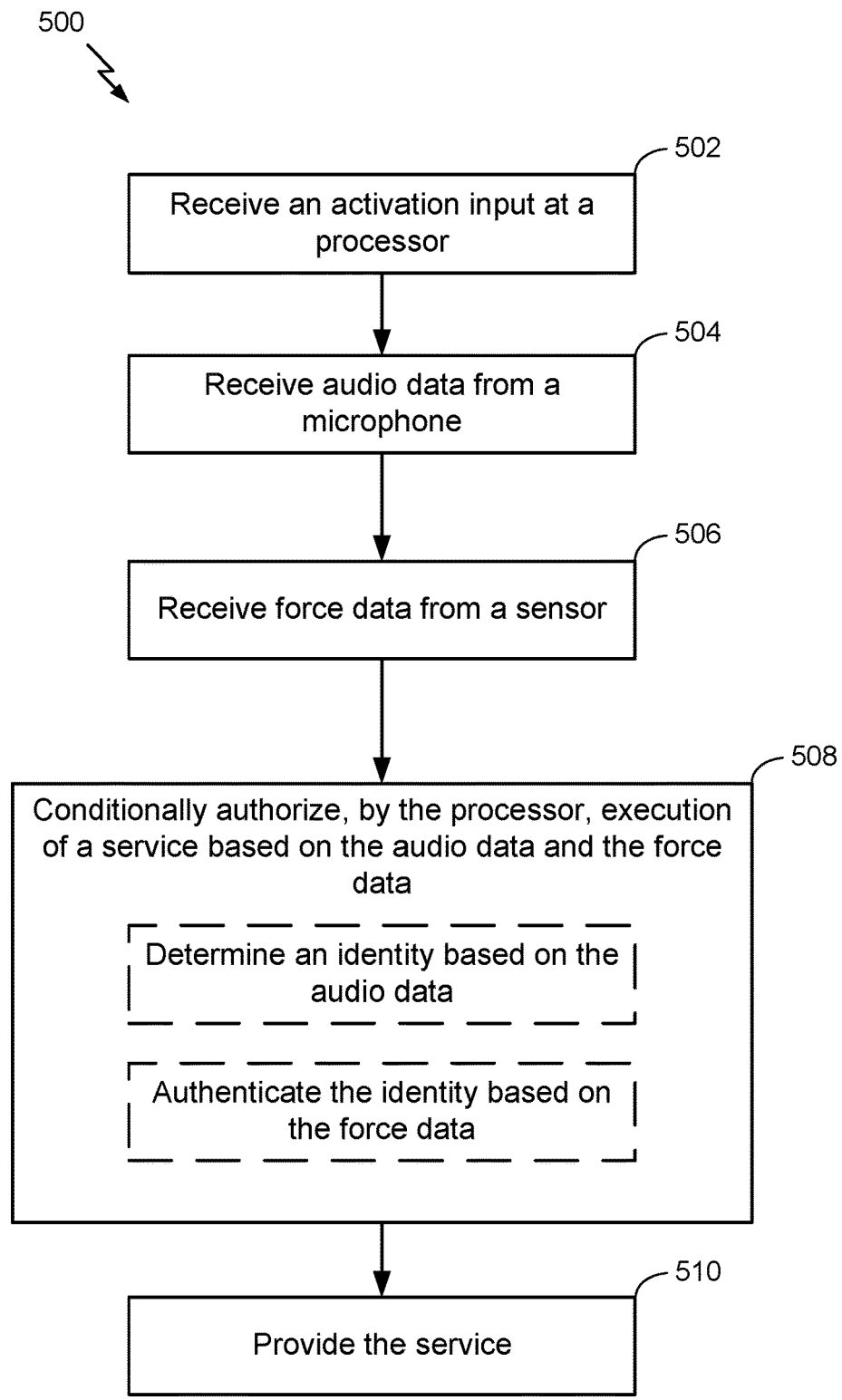
FIG. 5 is a flowchart that illustrates a second example of a method of conditionally approving a service.

FIG. 5 illustrates a particular example of a method 500 of conditionally authorizing execution of a service. The method 500 may be performed by one or more of the processors described above, such as the processor 110 of FIGS. 1-3. In a particular implementation, the method 500 may be performed by one or more of the systems described above, such as the system 100 of FIG. 1, the system 200 of FIG. 3, the system 300 of FIG. 3, or a combination thereof.

The method 500 may include, at 502, receiving an activation input at a processor. For example, the processor 110 of FIGS. 1-3 may receive the activation input from a touchpad coupled to the first sensor 114a of FIG. 1.

The method 500 may also include, at 504, receiving, at the processor, audio Data from a microphone. For example, referring to FIG. 1, the processor 110 may receive first audio data from the first microphone 112a of the plurality of microphones 112a-112g.

The method 500 may further include, at 506, receiving, at the processor, force data from a sensor. For example, the processor 110 may receive the force data (e.g., vibration data) from the first sensor 114a of the plurality of sensors 114a-114c, as described with reference to FIG. 1. As another example, the processor 110 may receive weight data from the first weight sensor 214a of FIG. 2.

The method 500 may also include, at 508, conditionally authorizing, by the processor, execution of a service based on the audio data, the force data (e.g., the input, the weight input, or both), or a combination thereof. For example, the processor 110 may conditionally authorize ignition of the engine of the vehicle based on the first audio data and the vibration data, such as described with reference to FIGS. 1-3. To illustrate, the processor 110 may determine the identity of the first person 108a using voice-based identification and the first audio data. The processor 110 may authenticate (or verify) the identity of the first person 108a as the speaker of the audio input based on comparing the audio data to the vibration data, by comparing the weight data to stored weight information for the first person 108a, or a combination thereof, as illustrative, non-limiting examples.

The method 500 may further include, at 510, providing the service. For example, the processor 110 may provide the service (e.g., ignition of the engine, unlocking the doors, muting the radio, etc.) automatically after conditional authorization of execution of the service. As another example, the processor 110 may provide the service in response to a user input, sometime after the authorization.

By conditionally authorizing the service based on determining an identity and verifying the identity, the method 500 enables utilization of voice-based identification and authentication for critical or restricted services. Thus, the problems of false detection and spoofing, such as by playing a recorded voice, are reduced. As a result, the method 500 enables providing increased security and safety for voice-based identification and authentication.

Figure 6:
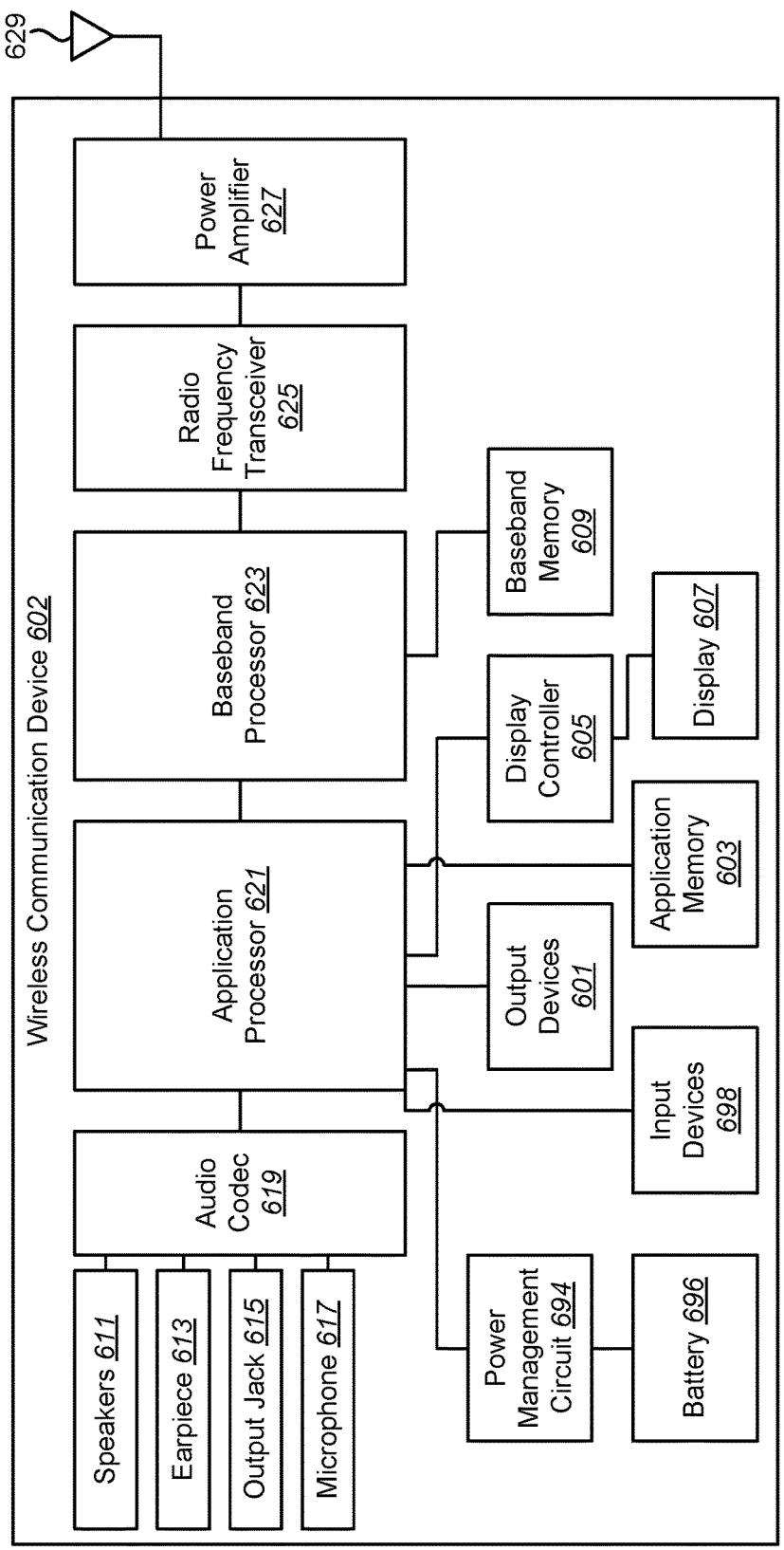
FIG. 6 is a diagram of a wireless device that is operable to support various implementations of one or more methods, systems, apparatuses, and computer-readable media disclosed herein.

FIG. 6 is a block diagram illustrating one configuration of a wireless communication device 602 in which aspects of various implementations herein disclosed may utilize or be implemented (at least in part). The wireless communication device 602 illustrated in FIG. 6 may be an example of one or more of the electronic devices described herein. The wireless communication device 602 may include an application processor 621. The application processor 621 generally processes instructions (e.g., runs programs) to perform functions on the wireless communication device 602. The application processor 621 may be coupled to an audio coder/decoder (codec) 619.

The audio codec 619 may be used for coding audio signals, decoding audio signals, or a combination thereof. The audio codec 619 may be coupled to at least one speaker 611, an earpiece 613, an output jack 615, at least one microphone 617, or a combination thereof. The speakers 611 may include one or more electro-acoustic transducers that convert electrical or electronic signals into acoustic signals. For example, the speakers 611 may be used to play music or output a speakerphone conversation, etc. The earpiece 613 may be another speaker or electro-acoustic transducer that can be used to output acoustic signals (e.g., speech signals) to a user. For example, the earpiece 613 may be used such that only a user may reliably hear the acoustic signal. The output jack 615 may be used for coupling other devices to the wireless communication device 602 for outputting audio, such as headphones. The speakers 611, the earpiece 613, the output jack 615, or a combination thereof, may generally be used for outputting an audio signal from the audio codec 619. The at least one microphone 617 may be an acousto-electric transducer that converts an acoustic signal (such as a user's voice) into electrical or electronic signals that are provided to the audio codec 619.

The application processor 621 may also be coupled to a power management circuit 694. One example of a power management circuit 694 is a power management integrated circuit (PMIC), which may be used to manage the electrical power consumption of the wireless communication device 602. The power management circuit 694 may be coupled to a battery 696. The battery 696 may generally provide electrical power to the wireless communication device 602. For example, the battery 696, the power management circuit 694, or a combination thereof, may be coupled to at least one of the elements included in the wireless communication device 602.

The application processor 621 may be coupled to at least one input device 698 for receiving input. Examples of input devices 698 include infrared sensors, image sensors, accelerometers, touch sensors, keypads, etc. The input devices 698 may allow user interaction with the wireless communication device 602. The application processor 621 may also be coupled to one or more output devices 601. Examples of output devices 601 include printers, projectors, screens, haptic devices, etc. The output devices 601 may allow the wireless communication device 602 to produce output that may be experienced by a user.

The application processor 621 may be coupled to application memory 603. The application memory 603 may be any electronic device that is capable of storing electronic information. Examples of application memory 603 include double data rate synchronous dynamic random access memory (DDRAM), synchronous dynamic random access memory (SDRAM), flash memory, etc. The application memory 603 may provide storage for the application processor 621. For instance, the application memory 603 may store data, instructions, or a combination thereof, for the functioning of programs that are run on the application processor 621, or a combination thereof.

The application processor 621 may be coupled to a display controller 605, which in turn may be coupled to a display 607. The display controller 605 may be a hardware block that is used to generate images on the display 607. For example, the display controller 605 may translate instructions, data, or a combination thereof, from the application processor 621 into images that can be presented on the display 607. Examples of the display 607 include liquid crystal display (LCD) panels, light emitting diode (LED) panels, cathode ray tube (CRT) displays, plasma displays, etc.

The application processor 621 may be coupled to a baseband processor 623. The baseband processor 623 generally processes communication signals. For example, the baseband processor 623 may demodulate, decode, or a combination thereof, received signals. Additionally or alternatively, the baseband processor 623 may encode, modulate, or a combination thereof, signals in preparation for transmission.

The baseband processor 623 may be coupled to baseband memory 609. The baseband memory 609 may be any electronic device capable of storing electronic information, such as SDRAM, DDRAM, flash memory, etc. The baseband processor 623 may read information (e.g., instructions, data, or a combination thereof) from, write information to, or a combination thereof, the baseband memory 609. Additionally or alternatively, the baseband processor 623 may use instructions, data, or a combination thereof, stored in the baseband memory 609 to perform communication operations.

The baseband processor 623 may be coupled to a radio frequency (RF) transceiver 625. The RF transceiver 625 may be coupled to a power amplifier 627 and one or more antennas 629. The RF transceiver 625 may transmit, receive, or a combination thereof, radio frequency signals. For example, the RF transceiver 625 may transmit an RF signal using a power amplifier 627 and at least one antenna 629. The RF transceiver 625 may also receive RF signals using the one or more antennas 629.

Additionally, the various implementations disclosed herein may comprise components of an electronic device or "computer" and its associated components; may themselves be a component of a larger, more comprehensive electronic device; or may be extended to include features of electronic devices with regard to memory, processing, storage, communications, and so forth. Likewise, various such implementations may also comprise computer-readable media having computer-readable instructions.

Figure 7:
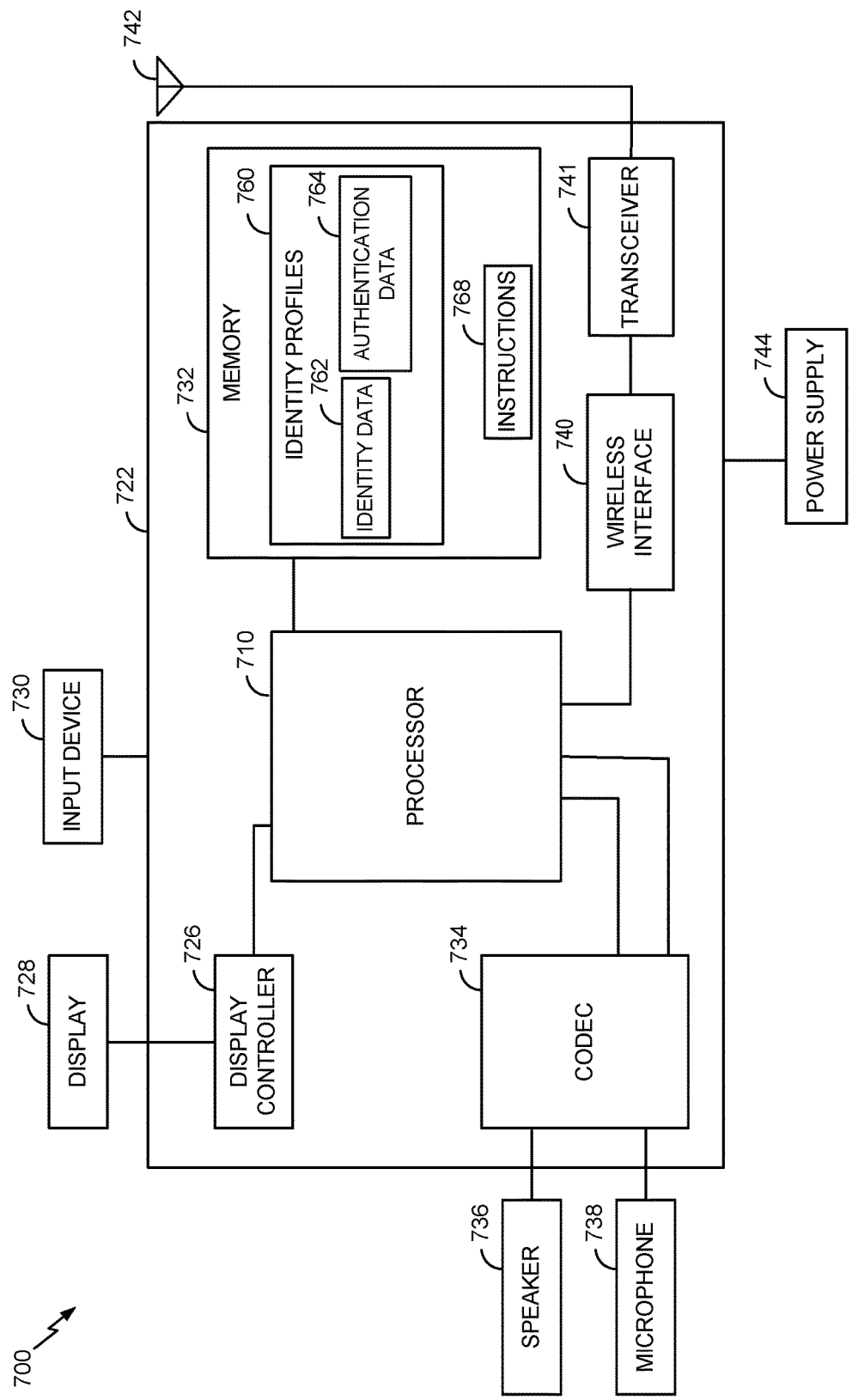
FIG. 7 is a diagram of another wireless device that is operable to support various implementations of one or more methods, systems, apparatuses, and computer-readable media disclosed herein.

Referring to FIG. 7, a particular illustrative implementation of a wireless communication device is depicted and generally designated 700. The device 700 includes a processor 710, such as a digital signal processor, coupled to a memory 732. The device 700, or components thereof, may include or correspond to the system 100 of FIG. 1, the system 200 of FIG. 2, the system 300 of FIG. 3, the processor 110 of FIGS. 1-3, or components thereof.

Memory 732, such as a non-transitory computer readable medium (e.g., a computer readable storage device), may include identity profiles 760 and instructions 768. The instructions 768 may be executable by the processor 710. For example, the memory 732 may include or correspond to the memory 111 of FIGS. 1-3. The identity profiles 760 may include identity data 762. For example, the identity data 762 may include or correspond to the identity data described with reference to FIGS. 1-3. The identity profiles 760 may include authentication data 764. For example, the authentication data 764 may include or correspond to the authentication data described with reference to FIGS. 1-3.

The processor 710 may be configured to execute software (e.g., a program of one or more instructions 768) stored in the memory 732. For example, the processor 710 may be configured to operate in accordance with the method 400 of FIG. 4, the method 500 of FIG. 5, or a combination thereof. To illustrate, the processor 710 may be configured to execute the instructions 768 that cause the processor 710 to authenticate an audio input produced by a person and received at a microphone associated with an acoustic space, the audio input authenticated based on vibrations produced by the person, the vibrations received at a sensor located within the acoustic space. The processor 710 may be configured to execute the instructions 768 that cause the processor 710 to conditionally authorize execution of a service requested by the person, where the service is conditionally authorized based on the audio input and the vibrations.

As another example, the instructions 768 may further cause the processor to compare second vibrations to a second audio input to generate a correlation value after execution of the service. The instructions 768 may further cause the processor to provide an indication of a denial of a second service in response to determining that the correlation value is less than a threshold.

FIG. 7 also shows a display controller 726 that is coupled to the processor 710 and to a display 728. A coder/decoder (CODEC) 734 can also be coupled to the processor 710. A speaker 736 and a microphone 738 can be coupled to the CODEC 734. The speaker 736 may include or correspond to one or more of the plurality of loudspeakers 218a-218h of FIGS. 2 and 3. The microphone 738 may include or correspond to one or more of the plurality of microphones 112a-112g of FIGS. 1-3.

FIG. 7 also indicates that a wireless interface 740 can be coupled to the processor 710 and to an antenna 742. For example, the wireless interface 740 may be coupled to the antenna 742 via a transceiver 741. The transceiver 741 may include a transmitter, a receiver, or both.

In some implementations, the processor 710, the display controller 726, the memory 732, the CODEC 734, the wireless interface 740, and the transceiver 741 are included in a system-in-package or system-on-chip device 722. In a particular implementation, an input device 730 and a power supply 744 are coupled to the system-on-chip device 722. Moreover, in another particular implementation, as illustrated in FIG. 7, the display 728, the input device 730, the speaker 736, the microphone 738, the antenna 742, and the power supply 744 are external to the system-on-chip device 722. However, each of the display 728, the input device 730, the speaker 736, the microphone 738, the antenna 742, and the power supply 744 can be coupled to a component of the system-on-chip device 722, such as an interface or a controller.

The various components of the electronic device 700 may be coupled together by one or more buses, which may include a power bus, a control signal bus, a status signal bus, a data bus, etc. For example, the various buses may couple the processor 710 and the memory 732 together.

In conjunction with one or more of the described aspects of FIGS. 1-7, a system is disclosed that may include means for storing data associated with a service that is available. For example, the means for storing data may include or correspond to the memory 111 of FIG. 1, the application memory 603 of FIG. 6, the baseband memory 609 of FIG. 6, the memory 732 of FIG. 7, one or more other, structures, devices, or circuits configured to detect vibrations, or any combination thereof.

The system may also include means for receiving an audio input produced by a person and generating audio data based on the audio input, the means for receiving associated with an acoustic space. For example, the means for receiving the audio input may include or correspond to one or more of the plurality of microphones 112a-112g of FIGS. 1-3, other equipment that is configured to convert a received audio signal from an analog waveform into a digital signal that includes digital audio samples (e.g., the ADC), one or more other microphones, transducers, structures, devices, or circuits configured to receive audio input, or any combination thereof.

The system may include means for detecting vibrations produced by the person and generating vibration data based on the vibrations, the means for detecting located within the acoustic space. For example, the means for detecting vibrations may include or correspond to one or more of the plurality of sensors 114a-114c of FIG. 1, one or more of the plurality of weight sensors 214a-214c of FIG. 2, one or more of the plurality of force sensors 314a-314d of FIG. 3, one or more other, structures, devices, or circuits configured to detect vibrations, or any combination thereof.

The system may further include means for conditionally authorizing execution of a service requested by the person, the service conditionally authorized based on the audio data and the vibration data, where the means for conditionally authorizing is coupled to the means for storing data, the means for receiving, and the means for detecting. For example, the means for conditionally authorizing may include or correspond to the processor 110 of FIGS. 1-3, the application processor 621 of FIG. 6, the baseband processor of FIG. 6, the processor 710 programmed to execute the instructions 768 of FIG. 7, one or more other, structures, devices, or circuits configured to conditionally authorize a service based on audio input and vibrations, or any combination thereof.

Additionally or alternatively, in some implementations, the system may include means for receiving a force input, such as an input. For example, the means for receiving the force input may include or correspond to one or more of the plurality of sensors 114a-114c of FIG. 1, one or more of the plurality of weight sensors 214a-214c of FIG. 2, one or more of the plurality of force sensors 314a-314d of FIG. 3, one or more other, structures, devices, or circuits configured to receive a force input (e.g., a input), or any combination thereof.

One or more of the disclosed implementations may be implemented in a system or an apparatus, such as the electronic device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the electronic device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-5 may illustrate systems, apparatuses, methods, or a combination thereof, according to the teachings of the disclosure, the disclosure is not limited to these illustrated systems, apparatuses, methods, or a combination thereof. One or more functions or components of any of FIGS. 1-7 as illustrated or described herein may be combined with one or more other portions of another function or component of FIGS. 1-7. Accordingly, no single implementation described herein should be construed as limiting and implementations of the disclosure may be suitably combined without departing from the teachings of the disclosure.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A system comprising:
   a memory configured to store data associated with a service that is available;
   a microphone associated with an acoustic space and configured to receive an audio input produced by a person;
   a sensor located within the acoustic space and configured to receive and detect vibrations, wherein the vibrations are produced by the person and propagate from the person to the sensor via the person, an object, or a combination thereof; and
   a processor coupled to the memory, to the microphone, and to the sensor, the processor configured to conditionally authorize execution of the service requested by the person, the service conditionally authorized based on the audio input and the vibrations.

2. The system of claim 1, wherein the processor is further configured to:
   determine an identity of the person based on the audio input, the identity of the person associated with an identity profile stored in the memory, wherein the identity profile indicates a plurality of services available to be requested by the person; and
   authenticate the identity based on the vibrations.

3. The system of claim 2, wherein the processor is further configured to conditionally authorize execution of the service responsive to an authentication of the identity.

4. The system of claim 1, wherein the acoustic space corresponds to an interior of a vehicle, wherein the processor is further configured to initiate the service after conditionally authorizing the execution of the service, and wherein the service corresponds to ignition of an engine of a vehicle, unlocking the vehicle, contacting an emergency service provider via a communication device associated with a person, providing personalized services, or a combination thereof.

5. The system of claim 4, wherein the vehicle comprises an automobile, a plane, a ship, or a train, wherein the vehicle includes multiple zones and is associated with the acoustic space, and wherein the processor is wirelessly coupled to the microphone, the sensor, or both.

6. The system of claim 4, wherein the sensor is located in a seat, in a headrest, in a steering wheel, in a gear shifter, in a dashboard, or a combination thereof.

7. The system of claim 1, wherein the sensor includes a seismic sensor, a vibration sensor, a pressure sensor, a load cell, an accelerometer, a piezoelectric sensor, a touchpad sensor, or a combination thereof.

8. The system of claim 1, further comprising a touchpad coupled to the sensor and configured to activate the sensor to receive the vibrations in response to activation of the touchpad.

9. The system of claim 1, further comprising a first weight sensor, a plurality of second weight sensors, or both, located within the acoustic space, the first weight sensor configured to detect a weight value or a pressure value, the plurality of second weight sensors configured in an array to detect a weight distribution pattern or a pressure distribution pattern.

10. The system of claim 1, further comprising a plurality of microphones coupled to the processor, the plurality of microphones including the microphone and a second microphone configured to receive a second audio input produced by the person, wherein the processor is configured to determine a location of the person in a three-dimensional space of the acoustic space within a vehicle based at least in part on the audio input received by the microphone and the second audio input received by the second microphone.

11. The system of claim 10, wherein the data stored at the memory indicates the service is associated with a zone of a plurality of zones of the acoustic space, and wherein the processor is further configured to authorize the service based on a determination that the location is within the zone.

12. The system of claim 10, further comprising an image capture device configured to capture at least one image of a face of the person at the location, wherein the processor is configured to:
   determine an identity of the person based on the audio input;
   determine a facial characteristic of the face of the person based on the at least one image; and
   authenticate the identity of the person based on a comparison of the facial characteristic to stored facial characteristic information of an identity profile associated with the identity of the person.

13. The system of claim 10, further comprising an image capture device configured capture at least one image of a face of the person at the location, wherein the processor is further configured to:
   determine an identity of the person based on the audio input, the at least one image, or a combination thereof; and
   authenticate the identity based on the at least one image, the vibrations, or a combination thereof.

14. The system of claim 10, further comprising an image capture device configured to capture an image of a gesture performed by the person at the location, wherein the processor is configured to identify the gesture, and wherein the processor is configured to authenticate an identity of the person further based on the gesture.

15. A method comprising:
receiving, at a processor from a microphone associated with an acoustic space, audio data generated by the microphone based on an audio input produced by a person;
receiving, at the processor from a sensor located within the acoustic space, vibration data generated by the sensor based on vibrations produced by the person and received at the sensor, wherein the vibrations propagate from the person to the sensor via the person, an object, or a combination thereof; and
conditionally authorizing, by the processor, execution of a service requested by the person, wherein the service is conditionally authorized based on the audio data and the vibration data.

16. The method of claim 15, further comprising:
determining an identity of a person based on the audio data; and
authenticating the identity based on the vibration data, wherein the service is authorized responsive to an authentication of the identity.

17. The method of claim 15, wherein the vibration data includes a noise component and an audio vibration component that corresponds to at least the audio input, and further comprising:
filtering the noise component from the vibration data to isolate the audio vibration component;
comparing the audio data to the audio vibration component to generate a correlation value; and
comparing the correlation value to a threshold, wherein execution of the service is conditionally authorized in response to the correlation value being greater than or equal to the threshold.

18. The method of claim 17, wherein filtering the noise component from the vibration data comprises:
receiving second vibration data from a second sensor, the second vibration data associated with the noise component; and
subtracting the second vibration data from vibration data to generate the audio vibration component.

19. The method of claim 15, further comprising:
receiving, at the processor, weight data from a weight sensor;
determining a weight value based on the weight data;
comparing the weight value to stored weight information associated with an identity of the person to generate a correlation value, wherein the identity is determined based on the audio data; and
authenticating the person in response to the correlation value being greater than or equal to a threshold.

20. The method of claim 15, further comprising:
receiving weight data from an array of weight sensors;
generating weight distribution pattern data based on the weight data;
comparing the weight distribution pattern data to stored weight distribution pattern information associated with an identity of the person to generate a correlation value, wherein the identity is determined based on the audio input; and
authenticating the person in response to the correlation value being greater than or equal to a threshold.

21. The method of claim 15, further comprising receiving, at the processor, a sequence of data inputs from one or more sensors, and wherein conditionally authorizing the service is further based on the sequence of data inputs.

22. The method of claim 21, wherein the sequence of data inputs includes the audio data, the vibration data, image data, brake sensor data, accelerator sensor data, radio sensor data, or a combination thereof.

23. The method of claim 21, wherein receiving the sequence of data inputs comprises:
receiving a first data input from a first sensor of the one or more sensors at a first time, the first sensor comprising a brake sensor;
receiving a second data input from a second sensor of the one or more sensors at a second time, wherein the second data input corresponds to the audio data and the second sensor corresponds to the microphone; and
receiving a third data input from a third sensor of the one or more sensors at a third time, the third sensor comprising an image capture device.

24. The method of claim 15, further comprising:
accessing driving pattern information associated with an identity of the person after conditionally authorizing the execution of the service, wherein the identity is determined based on the audio data;
receiving, at the processor, acceleration data from an accelerometer;
determining a driving pattern characteristic based on the acceleration data;
comparing the driving pattern characteristic to the driving pattern information to generate a correlation value; and
conditionally authorizing execution of a second service in response to the correlation value being greater than or equal to a threshold.

25. The method of claim 24, wherein the driving pattern characteristic comprises an average rate of braking or an average rate of accelerating, and wherein the second service includes providing an indication of abnormal driving via a user interface.

26. The method of claim 15, further comprising:
receiving a request to create an identity profile from the person via a user interface;
after receiving the request, receiving identity data associated with a voiceprint model of the person and authentication data associated with weight distribution pattern data of the person; and
storing the identity data and the authentication data in association with the identity profile of the person.

27. A system comprising:
means for storing data associated with a service that is available;
means for receiving an audio input produced by a person and generating audio data based on the audio input, the means for receiving the audio input associated with an acoustic space;
means for receiving vibrations produced by the person and generating vibration data based on the vibrations received at the means for receiving vibrations, the means for receiving vibrations and generating vibration data located within the acoustic space, and wherein the vibrations propagate from the person to the means for receiving vibrations via the person, an object, or a combination thereof; and
means for conditionally authorizing execution of a service requested by the person, the service conditionally authorized based on the audio data and the vibration data, wherein the means for conditionally authorizing is coupled to the means for storing data, the means for receiving, and the means for receiving vibrations and generating vibration data.

28. The system of claim 27, wherein the means for receiving the audio input is located in the acoustic space, wherein the acoustic space comprises a concert hall, a theatre, a conference room, an office, or a combination thereof.

29. A non-transitory computer readable medium comprising computer-executable instructions that, when executed by a processor, cause the processor to:
   authenticate an audio input produced by a person and received at a microphone associated with an acoustic space, the audio input authenticated based on vibrations produced by the person, the vibrations received at a sensor located within the acoustic space, wherein the vibrations propagate from the person to the sensor via the person, an object, or a combination thereof; and
   conditionally authorize execution of a service requested by the person, wherein the service is conditionally authorized based on the audio input and the vibrations.

30. The computer readable medium of claim 29, wherein the computer-executable instructions further cause the processor to:
   compare second vibrations to a second audio input to generate a correlation value after execution of the service; and
   provide an indication of a denial of a second service in response to determining that the correlation value is less than a threshold.

* * * * *